(12) United States Patent
Watanabe et al.

(10) Patent No.: US 12,217,512 B2
(45) Date of Patent: Feb. 4, 2025

(54) INFORMATION PROCESSING APPARATUS AND INFORMATION PROCESSING METHOD

(71) Applicant: SONY GROUP CORPORATION, Tokyo (JP)

(72) Inventors: Ryo Watanabe, Tokyo (JP); Mikio Nakai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 344 days.

(21) Appl. No.: 17/607,057

(22) PCT Filed: Apr. 27, 2020

(86) PCT No.: PCT/JP2020/017911
§ 371 (c)(1),
(2) Date: Oct. 28, 2021

(87) PCT Pub. No.: WO2020/226085
PCT Pub. Date: Nov. 12, 2020

(65) Prior Publication Data
US 2022/0207883 A1    Jun. 30, 2022

(30) Foreign Application Priority Data
May 9, 2019    (JP) .................................. 2019-089248

(51) Int. Cl.
G06V 20/58    (2022.01)
G06V 10/764    (2022.01)
G06V 30/19    (2022.01)

(52) U.S. Cl.
CPC ............ *G06V 20/58* (2022.01); *G06V 10/764* (2022.01); *G06V 30/19153* (2022.01)

(58) Field of Classification Search
CPC ...... G06V 20/58; G06V 20/17; G06V 10/764; G06V 10/26; G06V 30/19153; G06F 18/22; G06N 3/08; G05D 1/02
See application file for complete search history.

(56) References Cited

U.S. PATENT DOCUMENTS 10,741,070 B1 *    8/2020   Vijaya Kumar ....... G06V 20/58
2012/0323479 A1   12/2012   Nagata
(Continued)

FOREIGN PATENT DOCUMENTS

CN    102189557 A    9/2011
CN    102763146 A    10/2012
(Continued)

OTHER PUBLICATIONS

International Search Report and Written Opinion of PCT Application No. PCT/JP2020/017911, issued on Aug. 4, 2020, 09 pages of ISRWO.

*Primary Examiner* — John B Strege
(74) *Attorney, Agent, or Firm* — CHIP LAW GROUP

(57) ABSTRACT

An information processing apparatus according to an embodiment of the present technology includes a classification unit and a generation unit. The classification unit classifies an object detected in a space on a basis of a predetermined criterion. The generation unit sets a priority for the object on a basis of a classification result by the classification unit, and generates position-related information regarding a position in the space on a basis of the set priority. Use of the position-related information makes it possible to improve the accuracy of autonomous movement control. This makes it possible to improve the accuracy of autonomous movement control.

18 Claims, 15 Drawing Sheets

(56) References Cited

U.S. PATENT DOCUMENTS

| | | | |
|---|---|---|---|
| 2014/0002647 A1* | 1/2014 | Xu | H04N 7/18 348/143 |
| 2015/0321346 A1 | 11/2015 | Fujimoto | |
| 2017/0122749 A1 | 5/2017 | Urano | |
| 2018/0165508 A1* | 6/2018 | Othman | G06F 21/32 |
| 2018/0224857 A1* | 8/2018 | Yang | G05D 1/0212 |
| 2019/0064815 A1* | 2/2019 | Haynes | G06T 7/70 |
| 2019/0193721 A1* | 6/2019 | Yamamuro | B60W 30/182 |
| 2020/0207375 A1* | 7/2020 | Mehta | G06V 20/56 |
| 2020/0298847 A1* | 9/2020 | Tawari | B60W 30/0953 |
| 2022/0270460 A1* | 8/2022 | Sakai | G08B 21/0247 |
| 2023/0124314 A1* | 4/2023 | Foster | B60W 30/18163 701/26 |
| 2023/0153471 A1* | 5/2023 | Shalini | G06K 19/06037 726/34 |

FOREIGN PATENT DOCUMENTS

| | | |
|---|---|---|
| CN | 104252176 A | 12/2014 |
| CN | 105091885 A | 11/2015 |
| CN | 105210128 A | 12/2015 |
| CN | 107850895 A | 3/2018 |
| CN | 108510771 A | 9/2018 |
| CN | 108780615 A | 11/2018 |
| CN | 109425358 A | 3/2019 |
| EP | 2541524 A1 | 1/2013 |
| JP | 2011-081567 A | 4/2011 |
| JP | 2015-215749 A | 12/2015 |
| JP | 2015-222223 A | 12/2015 |
| JP | 2017-194527 A | 10/2017 |
| JP | 2019-064301 A | 4/2019 |
| WO | 2011/043350 A1 | 4/2011 |
| WO | 2011/101988 A1 | 8/2011 |
| WO | WO-2014203475 A1 | 12/2014 |

* cited by examiner

|  | In home (pet type robots etc.) | In factory (transfer robots etc.) | On ground of outside (autonomous driving cars etc.) | In outdoor air (drones etc.) |
|---|---|---|---|---|
| Stationary object | walls | walls, large machines in factory | telephone poles, traffic lights, houses, fences | houses, roofs |
| Quasi-stationary object | desks, chairs, light bulbs | racks, packages, light bulbs | trees (including leaves) | trees (including leaves) |
| Moving object | humans, animals (dogs, cats, etc.), other domestic robots | humans, other transfer robots | humans, vehicles (cars, trains), animals (dogs, cats, etc.) | humans, other drones, airplanes, animals (birds etc.) |

FIG.5

|  | Dead reckoning | Star reckoning |
|---|---|---|
| Recognizer | Internal sensor:<br><br>acceleration sensor,<br>gyro sensor,<br>IMU,<br>wheel encoder,<br>camera,<br>etc. | External sensor:<br>GPS,<br>magnetic sensor,<br>radio wave intensity sensor,<br>Lidar-ToF sensor<br>(three-dimensional<br>point cloud matching),<br>Place recognition<br>(image feature point matching),<br>etc. |
| Physical quantities | speed, acceleration,<br>relative position,<br>angular velocity | position,<br>posture |
| Absolute position /posture measurement | impossible | possible |
| Acquisition rate | high | low |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/017911 filed on Apr. 27, 2020, which claims priority benefit of Japanese Patent Application No. JP 2019-089248 filed in the Japan Patent Office on May 9, 2019. Each of the above-referenced applications is hereby incorporated herein by reference in its entirety.

TECHNICAL FIELD

The present technology relates to an information processing apparatus, an information processing method, and a program that are applicable to the control of a mobile object capable of autonomous movement.

BACKGROUND ART

Patent Literature 1 describes an environmental mapping system to be mounted on a mobile object having an autonomous driving function. In such an environmental mapping system, position information of each position in a space and a state quantity of the position (probability that an object exists at the position) are calculated. The position information, the representative value of the state quantity, and the changeability of the state quantity are associated with each other to generate map information. This makes it possible to more accurately represent the situation in the space (e.g., paragraphs [0021] to [0033] of the specification and FIG. 7 of Patent Literature 1).

CITATION LIST

Patent Literature

Patent Literature 1: Japanese Patent Application Laid-open No. 2017-194527

DISCLOSURE OF INVENTION

Technical Problem

As described above, there is a need for a technique capable of performing autonomous movement control of a mobile object with high accuracy.

In view of the above circumstances, it is an object of the present technology to provide an information processing apparatus, an information processing method, and a program that are capable of improving the accuracy of autonomous movement control.

Solution to Problem

In order to achieve the above object, an information processing apparatus according to an embodiment of the present technology includes a classification unit and a generation unit.

The classification unit classifies an object detected in a space on the basis of a predetermined criterion.

The generation unit sets a priority for the object on the basis of a classification result by the classification unit, and generates position-related information regarding a position in the space on the basis of the set priority.

In this information processing apparatus, an object detected in a space is classified on the basis of a predetermined criterion, and a priority is set on the basis of a classification result. On the basis of the set priority, position-related information regarding a position in the space is generated. Use of such position-related information makes it possible to improve the accuracy of autonomous movement control.

The classification unit may classify the object on the basis of a likelihood of movement of the object.

The classification unit may classify the object on the basis of date and time information.

The generation unit may set the priority on the basis of date and time information.

The classification unit may classify the object as a moving object, a quasi-stationary object, or a stationary object.

The generation unit may set a first priority for the object classified as the moving object, set a second priority higher than the first priority for the object classified as the quasi-stationary object, and set a third priority higher than the second priority for the object classified as the stationary object.

The classification unit may classify the object on the basis of detection information detected by a sensor of a mobile object that moves in the space. In this case, the generation unit may generate position information regarding a position and a posture of the mobile object in the space as the position-related information.

The generation unit may generate the position information of the mobile object by collating the detection information with map information regarding the space on the basis of the priority.

The generation unit may select collation target information to be collated with the map information from the detection information on the basis of the priority.

The generation unit may generate map information regarding the space as the position-related information.

The map information may include the position of the object detected in the space and the priority set for the object.

The map information may include at least one of an occupancy grid map or a group of image feature points each including position information.

The map information may be the occupancy grid map. In this case, the generation unit may set, on the basis of the priority, a priority for each grid of the occupancy grid map.

The generation unit may set divided regions for dividing the space into a plurality of regions on the basis of the classification result, and generate the map information for each of the divided regions.

The generation unit may set the divided regions on the basis of the position of the object detected in the space and the classification result of the object.

The generation unit may update the map information corresponding to each of the divided regions on the basis of movement of the object from each of the divided regions.

The generation unit may generate update information for updating the map information generated for each of the divided regions on the basis of the classification result of the object in each of the divided regions.

The update information may include at least one of a necessity of update, a timing of update, or a frequency of update.

An information processing method according to an embodiment of the present technology is an information processing method executed by a computer system, the method including: classifying an object detected in a space on the basis of a predetermined criterion; and setting a priority for the object on the basis of a classification result by the classification, and generating position-related information regarding a position in the space on the basis of the set priority.

A program according to an embodiment of the present technology causes a computer system to execute the following steps of: classifying an object detected in a space on the basis of a predetermined criterion; and setting a priority for the object on the basis of a classification result by the classification, and generating position-related information regarding a position in the space on the basis of the set priority.

BRIEF DESCRIPTION OF DRAWINGS

FIG. 5 is a table showing classification examples of the object.

FIG. 6 is a table for describing dead reckoning and star reckoning.

MODE(S) FOR CARRYING OUT THE INVENTION

Hereinafter, embodiments of the present technology will be described with reference to the drawings.

[Configuration Example of Mobile Object Control System]

Figure 1:
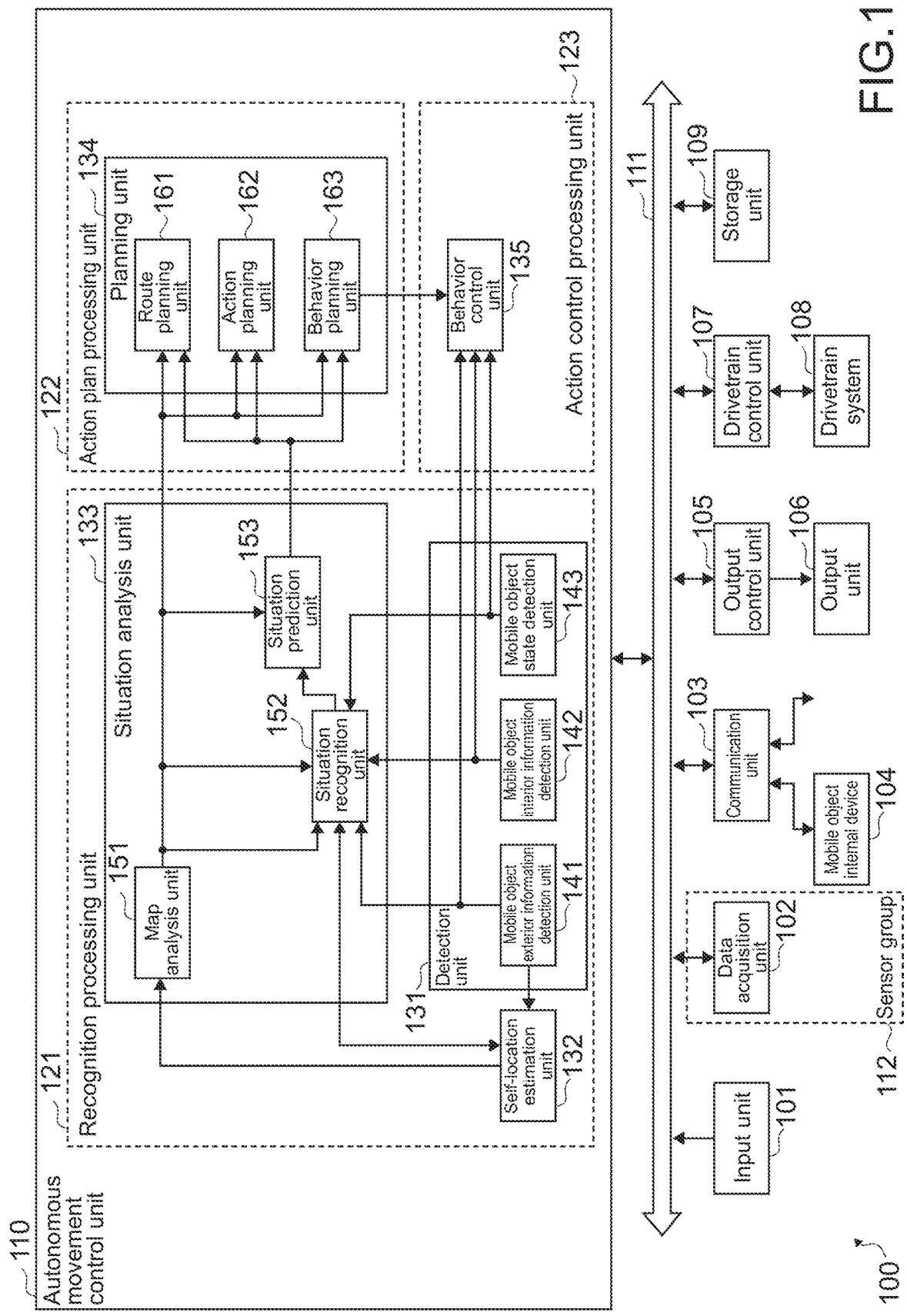
FIG. 1 is a block diagram showing an example of a schematic functional configuration of a mobile object control system for controlling autonomous movement of a mobile object according to an embodiment of the present technology.

FIG. 1 is a block diagram showing an example of a schematic functional configuration of a mobile object control system 100 for controlling autonomous movement of a mobile object according to an embodiment of the present technology. Note that the mobile object control system 100 of FIG. 1 is an example of a mobile object control system for controlling a mobile object including a robot to which the present technology can be applied, but it can also be applied as a system for controlling other mobile objects, for example, aircraft, ships, and multirotor copters (drones). Further, the robot may be a wheel-type robot or an autonomous driving vehicle on which a person can ride, or may be a multilegged walking robot. Of course, it can also be applied to a robot including a leg portion having an articulated structure as a drive portion.

The mobile object control system 100 includes an input unit 101, a data acquisition unit 102, a communication unit 103, a mobile object internal device 104, an output control unit 105, an output unit 106, a drivetrain control unit 107, a drivetrain system 108, a storage unit 109, and an autonomous movement control unit 110. The input unit 101, the data acquisition unit 102, the communication unit 103, the output control unit 105, the drivetrain control unit 107, the storage unit 109, and the autonomous movement control unit 110 are connected to each other via a communication network 111. For example, the communication network 111 includes a communication network or a bus compliant with any standard such as a controller area network (CAN), a local interconnect network (LIN), a local area network (LAN) such as IEEE802.3, or FlexRay (registered trademark), a unique communication method that is not standardized, or the like. Note that the units of the mobile object control system 100 may be directly connected to each other without using the communication network 111.

Note that, hereinafter, description of the communication network 111 will be omitted in the case where the units of the mobile object control system 100 communicate with each other via the communication network 111. For example, simple description indicating that the input unit 101 and the autonomous movement control unit 110 communicate with each other will be given, in the case where the input unit 101 and the autonomous movement control unit 110 communicate with each other via the communication network 111.

The input unit 101 includes an apparatus used to input various kinds of data, instructions, or the like. For example, the input unit 101 includes an operation device such as a touchscreen, a button, a microphone, a switch, or a lever, an operation device capable of inputting information by sound, gesture, or the like that is different from manual operation, or the like. Alternatively, for example, the input unit 101 may be external connection equipment such as a remote control apparatus using infrared or another radio wave, or mobile equipment or wearable equipment compatible with operation of the mobile object control system 100. The input unit 101 generates an input signal on the basis of input data, instructions, or the like, and supplies the generated input signal to the respective units of the mobile object control system 100.

The data acquisition unit 102 includes various kinds of sensors or the like for acquiring data to be used in processes performed by the mobile object control system 100, and supplies the acquired data to the respective units of the mobile object control system 100. For example, the data acquisition unit 102 includes various kinds of sensors for detecting a state or the like of the mobile object to constitute a sensor group 112.

Specifically, for example, the data acquisition unit 102 includes a geomagnetic sensor for detecting a direction, a gyro sensor, an acceleration sensor, an inertial measurement unit (IMU), and sensors or the like for detecting an amount of operation of an acceleration input such as an accelerator, an amount of operation of a deceleration input, an amount of operation of a direction instruction input, the number of revolutions and the input-output energy and fuel amount of a driving device such as an engine or a motor, an amount of torque of an engine, a motor, or the like, rotational speeds or torques of wheels or joints, and the like.

Further, for example, the data acquisition unit 102 includes various kinds of sensors for detecting information regarding the outside of the mobile object. Specifically, for example, the data acquisition unit 102 includes an imaging apparatus such as a time-of-flight (ToF) camera, a stereo camera, a monocular camera, an infrared camera, a polarization camera, or another camera. Further, for example, the data acquisition unit 102 includes an environment sensor for detecting weather, a meteorological phenomenon, or the like, and a surrounding information detection sensor for detecting objects around the mobile object. For example, the environment sensor includes a temperature sensor, a moisture sensor, a raindrop sensor, a fog sensor, a sunshine sensor, a snow sensor, or the like. The surrounding information detection sensor includes a laser ranging sensor, a contact sensor, an ultrasonic sensor, a radar, a LiDAR (Light Detection and Ranging, Laser Imaging Detection and Ranging) sensor, a sonar, or the like.

Furthermore, for example, the data acquisition unit 102 includes various kinds of sensors for detecting a current location of the mobile object. Specifically, for example, the data acquisition unit 102 includes a global navigation satellite system (GNSS) receiver that receives GNSS signals from a GNSS satellite.

In this embodiment, various detection results detected by the sensor group 112 correspond to detection information detected by the sensors included in the mobile object. The detection information includes not only the detection values detected by the sensor group 112 but also various types of data and the like that may be calculated from the detection values.

The communication unit 103 communicates with the mobile object internal device 104, various kinds of devices outside the mobile object, a server, a base station, or the like, transmits data supplied by the respective units of the mobile object control system 100, and supplies the received data to the respective units of the mobile object control system 100. Note that a communication protocol supported by the communication unit 103 is not specifically limited. Further, it is also possible for the communication unit 103 to support a plurality of types of communication protocols.

For example, the communication unit 103 establishes wireless connection with the mobile object internal device 104 by using a wireless LAN, Bluetooth (registered trademark), near-field communication (NFC), wireless USB (WUSB), or the like. Further, for example, the communication unit 103 establishes wired connection with the mobile object internal device 104 by using Universal Serial Bus (USB), High-Definition Multimedia Interface (HDMI), Mobile High-Definition Link (MHL), or the like via a connection terminal (and a cable if necessary) (not illustrated).

Furthermore, for example, the communication unit 103 communicates with equipment (for example, an application server or a control server) present on an external network (for example, the Internet, a cloud network, or a company-specific network) via a base station or an access point. Further, for example, the communication unit 103 communicates with a terminal (for example, a terminal of a pedestrian or a store, or a machine-type communication (MTC) terminal) present in the vicinity of the mobile object by using a peer-to-peer (P2P) technology. Furthermore, for example, if the mobile object is a vehicle, the communication unit 103 carries out V2X communication such as vehicle-to-vehicle communication, vehicle-to-infrastructure communication, vehicle-to-home communication between the mobile object and a home, or vehicle-to-pedestrian communication. Further, for example, the communication unit 103 includes a beacon receiver, receives a radio wave or an electromagnetic wave transmitted from a radio station or the like, and acquires information such as the current location or a necessary time.

The mobile object internal device 104 includes mobile equipment or wearable equipment possessed by a user, information equipment carried into or attached to the mobile object, a navigation apparatus that searches for a route to any destination, and the like, for example.

The output control unit 105 controls output of various kinds of information to the outside of the mobile object. For example, the output control unit 105 generates an output signal that includes at least one of visual information (such as image data) or audio information (such as sound data), supplies the output signal to the output unit 106, and thereby controls output of the visual information and the audio information from the output unit 106. Specifically, for example, the output control unit 105 combines pieces of image data captured by different imaging apparatuses included in the data acquisition unit 102, generates a bird's-eye image, a panoramic image, or the like, and supplies an output signal including the generated image to the output unit 106. Further, for example, the output control unit 105 generates sound data including warning sound, a warning message, or the like with regard to danger such as collision, contact, or entrance into a danger zone, and supplies an output signal including the generated sound data to the output unit 106.

The output unit 106 includes an apparatus capable of outputting the visual information or the audio information to the outside of the mobile object. For example, the output unit 106 includes a display apparatus, an instrument panel, an audio speaker, headphones, a wearable device such as an eyeglass type display worn by the user or the like, a projector, a projector, a lamp, or the like. Instead of an apparatus including a usual display, the display apparatus included in the output unit 106 may be, for example, an apparatus that displays the visual information within a field of view of the driver, such as a head-up display, a transparent display, or an apparatus having an augmented reality (AR) function. Note that the output control unit 105 and the output unit 106 are not indispensable for the autonomous movement processing, and thus they may be omitted as necessary.

The drivetrain control unit 107 generates various kinds of control signals, supplies them to the drivetrain system 108, and thereby controls the drivetrain system 108. Further, as necessary, the drivetrain control unit 107 supplies the control signals to structural elements other than the drivetrain system 108 and notifies them of a control state of the drivetrain system 108 or the like.

The drivetrain system 108 includes various kinds of apparatuses related to the drivetrain of the mobile object. For example, the drivetrain system 108 includes a servo motor provided in each joint of the four legs and capable of specifying the angle or torque, a motion controller that decomposes and replaces the movement of the robot itself into movements of the four legs, and a feedback controller by a sensor of each motor or a sensor on the sole surface.

In another example, the drivetrain system 108 includes a motor with four or six upward propellers, and a motion controller that decomposes and replaces the movement of the robot itself into the rotational amount of each motor.

Furthermore, in another example, the drivetrain system 108 includes a driving force generation apparatus for generating driving force of an internal combustion engine, a driving motor, or the like, a driving force transmitting mechanism for transmitting the driving force to wheels, a steering mechanism for adjusting the steering angle, a braking apparatus for generating braking force, an anti-lock braking system (ABS), an electronic stability control (ESC) system, an electric power steering apparatus, or the like.

The storage unit 109 includes read only memory (ROM), random access memory (RAM), a magnetic storage device such as a hard disc drive (HDD) or the like, a semiconductor storage device, an optical storage device, a magneto-optical storage device, or the like, for example. The storage unit 109 stores various kinds of programs, data, and the like used by respective units of the mobile object control system 100. For example, the storage unit 109 stores map data (map information) such as a three-dimensional high-accuracy map, a global map, and a local map. The three-dimensional high-accuracy map is a dynamic map or the like. The global map has lower accuracy than the high-accuracy map but covers wider area than the high-accuracy map. The local map includes information regarding surroundings of the mobile object.

The autonomous movement control unit 110 performs control with regard to autonomous movement such as autonomous driving or driving assistance. Specifically, for example, the autonomous movement control unit 110 performs cooperative control intended to implement functions of collision avoidance or shock mitigation for the mobile object, following movement based on a following distance, mobile object speed maintaining movement, a warning of collision of the mobile object, or the like. Further, for example, it is also possible for the autonomous movement control unit 110 to perform cooperative control intended for autonomous movement that makes the mobile object travel autonomously without depending on the operation of the user or the like.

The autonomous movement control unit 110 functions as an embodiment of an information processing apparatus according to the present technology and includes hardware necessary for a computer such as a CPU, a RAM, and a ROM. An information processing method according to the present technology is executed when the CPU loads a program according to the present technology, which is stored in advance in the ROM, to the RAM and executes the program.

The program is installed on the autonomous movement control unit 110 via various recording media, for example. Alternatively, the installation of the program may be executed via the Internet or the like.

Note that the type or the like of the recording medium on which the program is recorded is not limited, and any computer-readable recording medium may be used. For example, any recording medium for recording data in a non-transitory manner may be used.

A specific configuration of the autonomous movement control unit 110 is not limited. For example, a programmable logic device (PLD) such as a field-programmable gate array (FPGA) or another device such as an application-specific integrated circuit (ASIC) may be used.

As shown in FIG. 1, the autonomous movement control unit 110 includes a detection unit 131, a self-location estimation unit 132, a situation analysis unit 133, a planning unit 134, and a behavior control unit 135. Of those, the detection unit 131, the self-location estimation unit 132, and the situation analysis unit 133 constitute a recognition processing unit 121. Further, the planning unit 134 constitutes an action plan processing unit 122. Furthermore, the behavior control unit 135 constitutes an action control processing unit 123.

The detection unit 131 detects various kinds of information necessary to control autonomous movement of the mobile object. The detection unit 131 includes a mobile object exterior information detection unit 141, a mobile object interior information detection unit 142, and a mobile object state detection unit 143.

The mobile object exterior information detection unit 141 performs a process of detecting information regarding an outside of the mobile object on the basis of data or signals from the respective units of the mobile object control system 100. For example, the mobile object exterior information detection unit 141 performs a detection process, a recognition process, a tracking process of objects around the mobile object, and a process of detecting distances to the objects. Examples of the detection target object include a mobile object, a person, an obstacle, a structure, a road, a traffic light, a traffic sign, a road sign, and the like. Further, for example, the mobile object exterior information detection unit 141 performs a process of detecting an ambient environment around the mobile object. Examples of the ambient environment around the detection target include weather, temperature, humidity, brightness, a road surface condition, and the like, for example. The mobile object exterior information detection unit 141 supplies data indicating results of the detection processes to the self-location estimation unit 132, a map analysis unit 151 and a situation recognition unit 152 of the situation analysis unit 133, the behavior control unit 135, and the like.

The mobile object interior information detection unit 142 performs a process of detecting information regarding an inside of the mobile object on the basis of data or signals from the respective units of the mobile object control system 100. For example, if there is a driver who drives the mobile object, the mobile object interior information detection unit 142 performs an authentication process and a recognition process of the driver, a detection process of a state of the driver, a detection process of a passenger, a detection process of an interior environment of the mobile object, and the like. Examples of the state of the driver, which is a detection target, include a health condition, a degree of consciousness, a degree of concentration, a degree of fatigue, a gaze direction, and the like. Examples of the interior environment of the mobile object, which is a detection target, include temperature, humidity, brightness, smell, and the like. The mobile object interior information detection unit 142 supplies data indicating results of the detection processes to the situation recognition unit 152 of the situation analysis unit 133, the behavior control unit 135, and the like.

The mobile object state detection unit 143 performs a process of detecting a state of the mobile object on the basis of data or signals from the respective units of the mobile object control system 100. Examples of the state of the mobile object, which is a detection target, includes speed, acceleration, a steering angle, presence/absence of abnormality, a content of the abnormality, a driving operation state, a position and inclination of the power seat, a state of a door lock, states of other mobile object-mounted equipment, and the like. The mobile object state detection unit 143 supplies data indicating results of the detection processes to the situation recognition unit 152 of the situation analysis unit 133, the behavior control unit 135, and the like.

The self-location estimation unit 132 performs a process of estimating a location, a posture, and the like of the mobile object on the basis of data or signals from the respective units of the mobile object control system 100, such as the mobile object exterior information detection unit 141 and the situation recognition unit 152 of the situation analysis unit 133. Further, as necessary, the self-location estimation unit 132 generates a local map to be used for estimating a self-location (hereinafter, referred to as a self-location estimation map). For example, the self-location estimation map may be a high-accuracy map using a technology such as simultaneous localization and mapping (SLAM). The self-location estimation unit 132 supplies data indicating a result of the estimation process to the map analysis unit 151 and the situation recognition unit 152 of the situation analysis unit 133, and the like. Further, the self-location estimation unit 132 causes the storage unit 109 to store the self-location estimation map.

Furthermore, the self-location estimation unit 132 accumulates the time-series information supplied in time series in the database on the basis of the detection result (detection information) supplied from the sensor group 112, estimates the self-location on the basis of the accumulated time-series information, and outputs it as time-series information self-location. Further, the self-location estimation unit 132 estimates the self-location on the basis of the current detection result supplied from the sensor group 112, and outputs it as current information self-location. The self-location estimation unit 132 then outputs a self-location estimation result by integrating or switching the time-series information self-location and the current information self-location. Furthermore, the self-location estimation unit 132 detects the posture of the mobile object on the basis of the detection result supplied from the sensor group 112. When the change in the posture is detected, and it is assumed that the self-location is greatly changed and the estimation accuracy of the time-series information self-location is lowered, the self-location estimation unit 132 estimates the self-location only from the current information self-location. Further, for example, if the mobile object is mounted on another mobile object and moves, the self-location changes greatly even if the change in the posture of the mobile object is not detected on the basis of the detection result supplied from the sensor group 112, and thus the self-location estimation unit 132 assumes that the estimation accuracy of the time-series information self-location is lowered, and estimates the self-location only from the current information self-location. This is conceivable in, for example, the case where the mobile object is a vehicle and moves while being mounted on a car ferry boat. In such a manner, even when there is a change in posture that is unpredictable in advance and the self-location largely changes regardless of the presence/absence of an influence of external force, the self-location is estimated only from the current information self-location, so that the self-location can be estimated with predetermined accuracy.

The situation analysis unit 133 performs a process of analyzing a situation of the mobile object and a situation around the mobile object. The situation analysis unit 133 includes the map analysis unit 151, the situation recognition unit 152, and a situation prediction unit 153.

The map analysis unit 151 performs a process of analyzing various kinds of maps stored in the storage unit 109 and constructs a map including information necessary for an autonomous movement process while using data or signals from the respective units of the mobile object control system 100, such as the self-location estimation unit 132 and the mobile object exterior information detection unit 141 as necessary. The map analysis unit 151 supplies the constructed map to the situation recognition unit 152, and the situation prediction unit 153, to a route planning unit 161, an action planning unit 162, a behavior planning unit 163 of the planning unit 134, and the like.

The situation recognition unit 152 performs a process of recognizing situations related to the mobile object on the basis of data or signals from the respective units of the mobile object control system 100, such as the self-location estimation unit 132, the mobile object exterior information detection unit 141, the mobile object interior information detection unit 142, the vehicle condition detection unit 143, and the map analysis unit 151. For example, the situation recognition unit 152 performs a process of recognizing a situation of the mobile object, a situation around the mobile object, a situation of the driver of the mobile object, and the like. Further, as necessary, the situation recognition unit 152 generates a local map to be used for recognizing the situation around the mobile object (hereinafter, referred to as a situation recognition map). For example, the situation recognition map may be an occupancy grid map, a road map (Lane Map), or a point cloud map.

Examples of the situation of the mobile object, which is a recognition target, include a location, a posture, and movement (such as speed, acceleration, or a movement direction, for example) of the mobile object, presence/absence of abnormality, contents of the abnormality, and the like. Examples of the situation around the mobile object, which is a recognition target, include types and locations of surrounding stationary objects, types, locations, and movement (such as speed, acceleration, and movement directions, for example) of surrounding moving objects, structures of surrounding roads, conditions of road surfaces, ambient weather, temperature, humidity, brightness, and the like. Examples of the state of the driver, which is a recognition target, include a health condition, a degree of consciousness, a degree of concentration, a degree of fatigue, movement of gaze, driving operation, and the like.

The situation recognition unit 152 supplies data indicating a result of the recognition process (including the situation recognition map as necessary) to the self-location estimation unit 132, the situation prediction unit 153, and the like. Further, the situation recognition unit 152 causes the storage unit 109 to store the situation recognition map.

The situation prediction unit 153 performs a process of predicting a situation related to the mobile object on the basis of data or signals from the respective units of the mobile object control system 100, such as the map analysis unit 151, the situation recognition unit 152, and the like. For example, the situation prediction unit 153 performs a process of predicting a situation of the mobile object, a situation around the mobile object, a situation of the driver, and the like.

Examples of the situation of the mobile object, which is a prediction target, includes behavior of the mobile object, occurrence of abnormality, a movable distance, and the like. Examples of the situation around the mobile object, which is a prediction target, includes behavior of moving objects, change in states of traffic lights, change in environments such as weather, and the like around the mobile object. Examples of the situation of the driver, which is a prediction target, include behavior, a health condition, and the like of the driver.

The situation prediction unit 153 supplies data indicating results of the prediction processes to the route planning unit 161, the action planning unit 162, and the behavior planning unit 163 of the planning unit 134 and the like in addition to the data from the situation recognition unit 152.

The route planning unit 161 plans a route to a destination on the basis of data or signals from the respective units of the mobile object control system 100, such as the map analysis unit 151 and the situation prediction unit 153. For example, the route planning unit 161 sets a route from the current location to a specified destination on the basis of the global map. Further, for example, the route planning unit 161 appropriately changes the route on the basis of situations such as humans, obstacles, traffic congestion, accidents, traffic regulation, and constructions, and a health condition and the like of the driver. The route planning unit 161 supplies data indicating the planned route to the action planning unit 162 and the like.

The action planning unit 162 plans an action of the mobile object for moving safely in the route planned by the route planning unit 161 within a planned time period, on the basis of data or signals from the respective units of the mobile object control system 100, such as the map analysis unit 151 and the situation prediction unit 153. For example, the action planning unit 162 plans start, stop, a driving direction (for example, forward, backward, left turn, right turn, change of direction, etc.), moving speed, overtaking, and the like. The action planning unit 162 supplies data indicating the action planned for the mobile object to the behavior planning unit 163 and the like.

More specifically, the action planning unit 162 generates, as action plan candidates, candidates of the action plan (movement plan) of the mobile object for moving safely within a planned time for each of the routes planned by the route planning unit 161. More specifically, the action planning unit 162 generates action plan candidates by, for example, an A* algorithm (A star search algorithm) of dividing an environment into grids and optimizing the arrival determination and the weight of the route to generate the best path, a lane algorithm of setting the route according to the road centerline, the Dijkstra's algorithm of obtaining the shortest route between two vertices on a graph, a rapidly-exploring random tree (RRT) algorithm of extending the path from the self-location to the incrementally reachable location while appropriately pruning the path, and the like.

The behavior planning unit 163 plans behavior of the mobile object for achieving the action planned by the action planning unit 162 on the basis of data or signals from the respective units of the mobile object control system 100, such as the map analysis unit 151 and the situation prediction unit 153. For example, the behavior planning unit 163 plans acceleration, deceleration, a movement course, and the like. The behavior planning unit 163 supplies data indicating the planed behavior of the mobile object to the behavior control unit 135 and the like.

The behavior control unit 135 controls behavior of the mobile object.

More specifically, the behavior control unit 135 performs a process of detecting collision, contact, entrance into a danger zone, or an emergency event such as abnormality of the driver or abnormality in the mobile object on the basis of detection results obtained by the mobile object exterior information detection unit 141, the mobile object interior information detection unit 142, and the mobile object state detection unit 143. In the case where occurrence of an emergency event is detected, the behavior control unit 135 plans behavior of the mobile object such as a quick stop or a quick turn for avoiding the emergency event.

Further, the behavior control unit 135 controls acceleration/deceleration to achieve the behavior of the mobile object planned by the behavior planning unit 163. For example, the behavior control unit 135 computes a control goal value of the driving force generation apparatus or the braking apparatus to achieve the planned acceleration, deceleration, or quick stop, and supplies a control instruction indicating the computed control goal value to the drivetrain control unit 107.

The behavior control unit 135 controls a direction to achieve the behavior of the mobile object planned by the behavior planning unit 163. For example, the behavior control unit 135 computes a control goal value of the steering mechanism to achieve a movement course or quick turn planned by the behavior planning unit 163, and supplies a control instruction indicating the computed control goal value to the drivetrain control unit 107.

Outline of Present Technology

Figure 2:
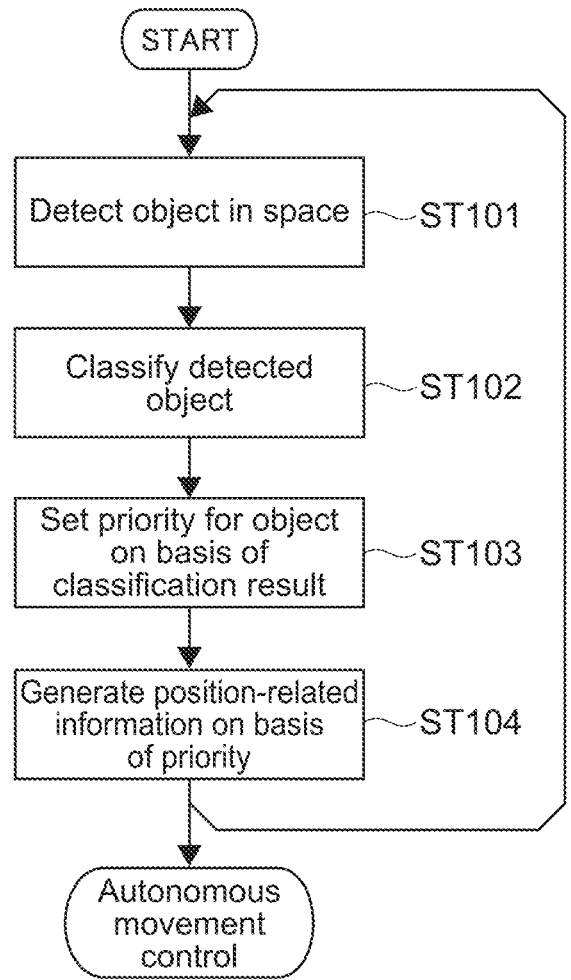
FIG. 2 is a flowchart for describing the outline of the present technology.

FIG. 2 is a flowchart for describing the outline of the present technology.

Each process shown in FIG. 2 is executed by, for example, the recognition processing unit 121 in the autonomous movement control unit 110 shown in FIG. 1. Any one or a plurality of blocks shown in FIG. 1 may cooperate to perform each process shown in FIG. 2. Alternatively, a new block different from the blocks shown in FIG. 1 may be configured to perform each process shown in FIG. 2.

An object in a space in which the mobile object moves is detected (Step 101).

For example, an object in the space is detected on the basis of the detection information detected by the sensor group 112 shown in FIG. 1.

For example, an object in the space can be detected on the basis of the detection information detected by various cameras, a LiDAR, a ToF sensor, or the like mounted on the mobile object.

The method of detecting an object in the space is not limited, and any technique may be used. For example, any image recognition technique such as a matching process using a model image of the object, edge detection, or projection transformation may be used. Any machine learning algorithm may be used to detect an object by using, for example, the deep neural network (DNN). For example, use of artificial intelligence (AI) or the like that performs deep learning makes it possible to improve the detection accuracy of an object. Note that the application of the machine learning algorithm may be performed for any process within the present disclosure.

In this embodiment, the block that executes Step 101 functions as a detection unit that detects an object in a space.

Figure 3:
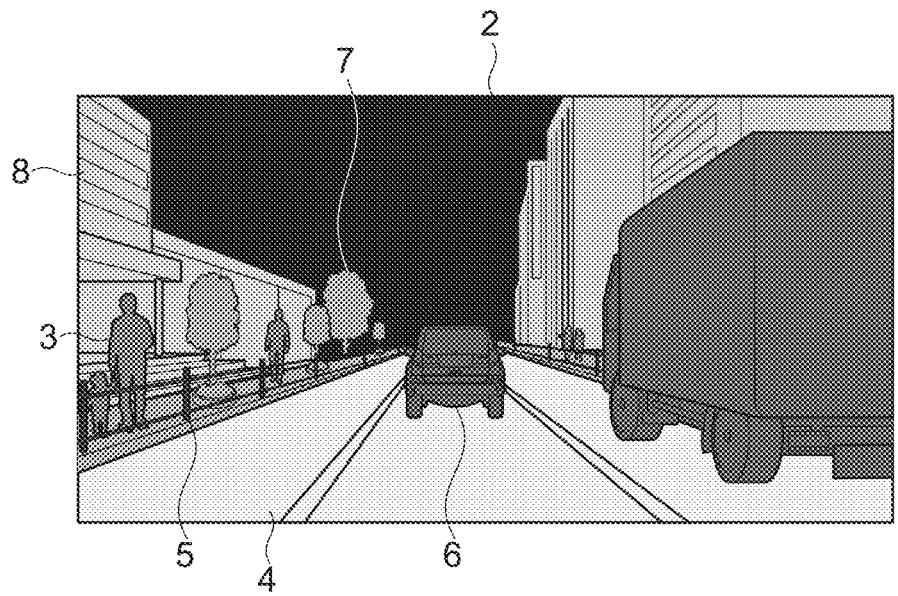
FIG. 3 is a schematic diagram for describing a detection example of an object in a space.

FIG. 3 is a schematic diagram for describing an example of detecting an object in a space.

For example, as shown in FIG. 3, semantic segmentation is performed on an image (image data) 2 captured by a camera. This makes it possible to associate each pixel in the image 2 with a label (person, vehicle, tree, road, building, etc.).

For example, in the example shown in FIG. 2, the semantic segmentation makes it possible to detect a person 3, a road 4, a guard rail 5, a vehicle 6, a tree 7, a building 8, and the like included in the image 2 with high accuracy.

Note that, in the present disclosure, the image includes a still image and a moving image. Of course, the image also includes a plurality of frame images included in the moving image.

Figure 4:
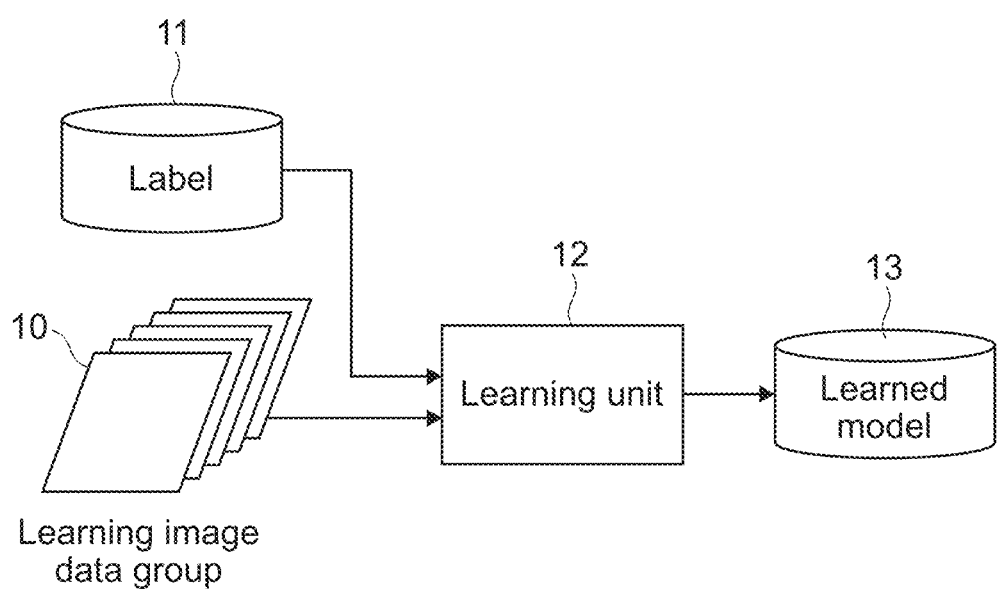
FIG. 4 is a schematic diagram for describing a generation example of a learned model of semantic segmentation.

FIG. 4 is a schematic diagram for describing an example of generating a learned model of the semantic segmentation.

A learning image data group 10 and a label 11 are input to a learning unit 12. The label 11 is information associated with each piece of learning image data. For example, information indicating that a certain pixel of certain image data is a person is stored as the label 11.

The method of associating the label 11 with the learning image data is not limited. For example, the label 11 may be set manually by the user for image data, and a learning data set may be generated. Alternatively, a learning data set in which the image data group 10 and the label 11 are associated with each other may be downloaded via a network or the like and input to the learning unit 12.

The learning unit 12 uses the learning data set and performs learning on the basis of a machine learning algorithm. Through the learning, the parameters (coefficients) for performing semantic segmentation are updated and generated as learned parameters. A program incorporating the generated learned parameters is generated as the learned model 13.

With the learned model 13, semantic segmentation is performed on the input of the image, and detection of the object is performed at the pixel level.

The detection information used to detect an object is not limited to the image 2 captured by the camera. For example, an object may be detected by inputting three-dimensional point cloud data obtained by a LiDAR or the like. For example, a label of a person, a vehicle, or the like may be associated with the three-dimensional point cloud data.

In the present disclosure, the detection of an object means the detection of the presence of an object in a space. For example, the semantic segmentation or the like may be used to identify the type or the like of an object existing in a space. On the other hand, if it is possible to detect the presence of some object in a space even if the type or the like of the object is not identifiable, such a process is also included in the detection of an object. For example, even when only the size, color, or the like of an object is detectable, such a process is also included in the detection of an object.

Returning to FIG. 2, the detected object is classified on the basis of predetermined criteria (Step 102). In this embodiment, the detected object is classified on the basis of the likelihood of movement of the object.

For example, the following classification is performed: constantly moving objects (100% of likelihood of movement); objects that are sometimes stationary but move for most of the time (high likelihood of movement); objects that move sometimes but are stationary for most of the time (low likelihood of movement); and objects that are constantly stationary (0% of likelihood of movement). The method of defining the likelihood of movement with respect to the object is not limited.

FIG. 5 is a table showing an example of the classification of the object.

In the example shown in FIG. 5, the detected object is classified into one of a moving object, a quasi-stationary object, and a stationary object. Further, different classification methods are exemplified on the basis of the situation of the space in which the object exists.

For example, in the case of a space in a home and where the mobile object is a pet type robot or the like, walls in the home are classified as stationary objects. Further, desks, chairs, light bulbs, etc. are also classified as quasi-stationary objects. Further, humans, animals (dogs, cats, etc.), other domestic robots, etc. are classified as moving objects.

In the case of a space in a factory and where a mobile object is a transfer robot etc., walls, large machines in the factory, etc. are classified as stationary objects. Racks (shelves), packages, light bulbs, etc. are classified as quasi-stationary objects. Humans, other transfer robots, etc. are classified as moving objects.

In the case of the ground of the outside space and where the mobile object is an autonomously movable vehicle etc., telephone poles, traffic lights, fences of houses, etc. are classified as stationary objects. Further, trees (including leaves) etc. are classified as quasi-stationary objects. Further, humans, cars, animals (dogs, cats, etc.) are classified as moving objects.

In the case of an outdoor air space and where the mobile object is a drone etc., houses, roofs, etc. are classified as stationary objects. Further, trees (including leaves) etc. are classified as quasi-stationary objects. Further, humans, other drones, airplanes, animals (birds etc.) are classified as moving objects.

For example, table information as shown in the table of FIG. 5 is stored in the storage unit 109. In Step 102, the table information is read from the storage unit 109, and the object detected in Step 101 is classified on the basis of the table information. The method of classifying the detected object on the basis of the likelihood of movement is not limited, and any other classification method may be employed.

As a parameter for classifying the object, date and time information may be employed.

For example, in some situations, a specific object may be almost moving during a specific time period, but may be almost stationary at a predetermined position during other time periods. For example, a specific transport robot in a factory may be in operation in the morning and may be on standby at a predetermined place in the afternoon. Further, it is also conceivable that a specific transport robot in a factory may be in operation on a specific day of the week and may be on standby on another day of the week.

Thus, the classification of the object may be performed on the basis of the date and time at which the object is detected. For example, even in the same object, if the detection time is a time period in which the object is almost moving, the object is classified as a moving object. On the other hand, if the detection time is a time period in which the object is almost stationary, the object is classified as a quasi-stationary object.

When such a process is executed, it is possible to improve the accuracy of classification of a moving object, a quasi-stationary object, or a stationary object. For example, information of a transport robot waiting at a specific position in a specific time period, a vehicle parked at a specific position in a specific time period, or the like can be used for the self-location estimation or the like to be described later. As a result, it becomes possible to improve the accuracy of the autonomous movement control of the mobile object.

The object detection of Step 101 and the classification of Step 102 may be performed collectively. For example, in the case where machine learning or the like is used, the classification result of a moving object, a quasi-stationary object, or a stationary object may be associated with a pixel or point data for the input of the image or the three-dimensional point cloud data. It is also possible to create such a learned model.

Note that, in such a case, the identification of the type of the object may be possible or not possible. That is, the object may be classified without obtaining information on the type of the object. Of course, even when such a process is executed, the presence of the object is detected, and therefore the detection of the object is executed.

Further, in a matching process using a model image or the like, the classification result may be associated with the model image. For example, the classification result of a moving object or the like is associated with a model image of a vehicle. The object detected by the matching using the model image of the vehicle is classified as a moving object at the same time as the detection.

In addition, when a moving image or the like is captured, the detection and classification of the object may be performed on the basis of a difference between frame images. Any other technique may be used.

Note that use of the semantic segmentation technique makes it possible to improve the robustness as compared with the matching process or the like using the model image, and to improve the accuracy of the detection and classification of the object.

In this embodiment, the block that executes Step 102 functions as a classification unit that classifies the object detected in the space on the basis of predetermined criteria.

Returning to FIG. 2, a priority is set for the object on the basis of the classification result (Step 103). The priority can also be referred to as weighting regarding the generation of the position-related information in Step 104.

For example, a first priority is set for the object classified as a moving object. A second priority higher than the first priority is set for the object classified as a quasi-stationary object. A third priority higher than the second priority is set for the object classified as a stationary object.

The specific value of the priority (weighting) is not limited and may be arbitrarily set.

For example, different priorities may be set for the objects classified into the same group. For example, it is assumed that a normalized value of 0 to 100 is set as the priority.

The priority is appropriately set for the moving object from the value of 0 to 30. The priority is appropriately set for the quasi-stationary object from the value of 30 to 80. The priority is appropriately set for the stationary object from the value of 80 to 100. Such a setting is also possible.

Note that the priority of zero (weighting of zero) means that it is not used as a processing target. On the other hand, the priority of 100 (weighting of 100) means that it is surely used as a processing target.

As a parameter for setting the priority, date and time information may be employed.

For example, a specific detected object may be detected and classified as a moving object, a quasi-stationary object, or a stationary object. For example, if the detection time of the object classified as a moving object is a time period in which the object does not move very frequently, the priority is set relatively high. On the other hand, if the detection time is a time period in which the object frequently moves, the priority is set relatively low.

When such a process is executed, it is possible to improve the setting accuracy of the priority and to improve the accuracy of the autonomous movement control of the mobile object.

As a parameter for setting the priority, the speed of the detected object may be employed. For example, if the speed of the object classified as a moving object is high, the priority is set relatively low. If the speed of the object is low, the priority is set relatively high. Alternatively, the priority is set to zero for a moving object of a speed equal to or higher than a predetermined speed. Such settings are also possible. It is also possible to change the priority according to a change in the speed.

Note that the method of detecting the speed of the object is not limited. For example, it is possible to detect the speed of the object on the basis of the difference between the frame images. Any other algorithms may be used.

Further, the priority may be set for the object classified as a quasi-stationary object on the basis of the speed.

Returning to FIG. 2, position-related information is generated on the basis of the priority set for the object (Step 104). The position-related information includes any information regarding the location in the space in which the mobile object moves.

In this embodiment, the position information of the mobile object moving in the space is generated as the position-related information. For example, the self-location estimation unit 132 shown in FIG. 1 estimates the self-location of the mobile object on the basis of the priority set for the object. The estimation result of the self-location is the position information of the mobile object, and is included in the position-related information.

In the present disclosure, the position information means information regarding a position and a posture. For example, as the position information, only information regarding the position may be generated, or only information regarding the posture may be generated. Of course, information including both the information regarding the position and the information regarding the posture may be generated. In addition, any information regarding the position and the posture, such as changes in the position and the posture, may be generated as the position information.

Further, map information regarding the space is generated as the position-related information.

In the present disclosure, the map information includes any information that may define a space (surrounding environment). For example, the map information includes an occupancy grid map, which will be described later, and point cloud data (such as three-dimensional point cloud data and image feature points), each piece of which includes position information.

In this embodiment, the blocks that execute Steps 103 and 104 function as a generation unit that sets a priority for an object on the basis of the classification result by the classification unit, and generates position-related information regarding a position in a space on the basis of the set priority.

The processes of Steps 101 to 104 are looped, and the generated self-location related information is used for the autonomous movement control. The trigger for executing the loop, the interval for executing the loop, and the like are not limited, and may be arbitrarily set.

Hereinafter, an example of the self-location estimation and the generation of map information will be described in detail as an embodiment of the generation of the position-related information according to the present technology.

[Self-Location Estimation]

FIG. 6 is a table for describing dead reckoning and star reckoning.

Dead reckoning is a method of estimating the self-location on the basis of the detection information detected by an internal sensor.

The internal sensor includes any recognizer capable of detecting information regarding the state and operation of the mobile object. The recognizer included in the internal sensor includes an acceleration sensor, a gyro sensor, an IMU, a wheel encoder, a camera, and the like. Physical quantities obtained from those sensors include speed, acceleration, relative position, angular velocity, and the like. On the basis of those physical quantities, the self-location of the mobile object is estimated.

Note that the dead reckoning is a method of measuring relative position information, and it is impossible to obtain absolute position and posture information. Further, the dead reckoning can continuously perform measurement at a high acquisition rate.

Star reckoning is a method of estimating the self-location on the basis of the detection information detected by an external sensor.

The external sensor includes any recognizer capable of detecting information external to the mobile object, such as surrounding information regarding the surrounding environment. The recognizer included in the external sensor includes a GPS, a magnetic sensor, a radio wave intensity sensor, a LiDAR, a ToF sensor, a camera, and the like. Physical quantities obtained from those sensors include a position, a posture, and the changes in position and posture. On the basis of those physical quantities, the self-location of the mobile object is estimated.

As shown in FIG. 6, the star reckoning includes three-dimensional point cloud matching in which the self-location is estimated by matching three-dimensional point cloud data obtained by the LiDAR, the ToF sensor, or the like with a pre-map. Further, the star reckoning includes image feature point matching in which the self-location is estimated by matching the image feature points extracted from the image captured by the camera with a pre-map. Needless to say, the present technology is not limited to those processes.

In the present disclosure, the three-dimensional point cloud data obtained by the LiDAR or the ToF sensor and the image feature points extracted from the captured image captured by the camera are both described as "point cloud data". The "point cloud" means one or more points, and a piece of three-dimensional data and a piece of image feature point data are also included in the "point cloud data". Further, the "point cloud data" is included in the detection information detected by the sensor.

It is possible to obtain absolute position and posture information by the star reckoning. On the other hand, the acquisition rate is low and continuous measurement is difficult.

Figure 7:
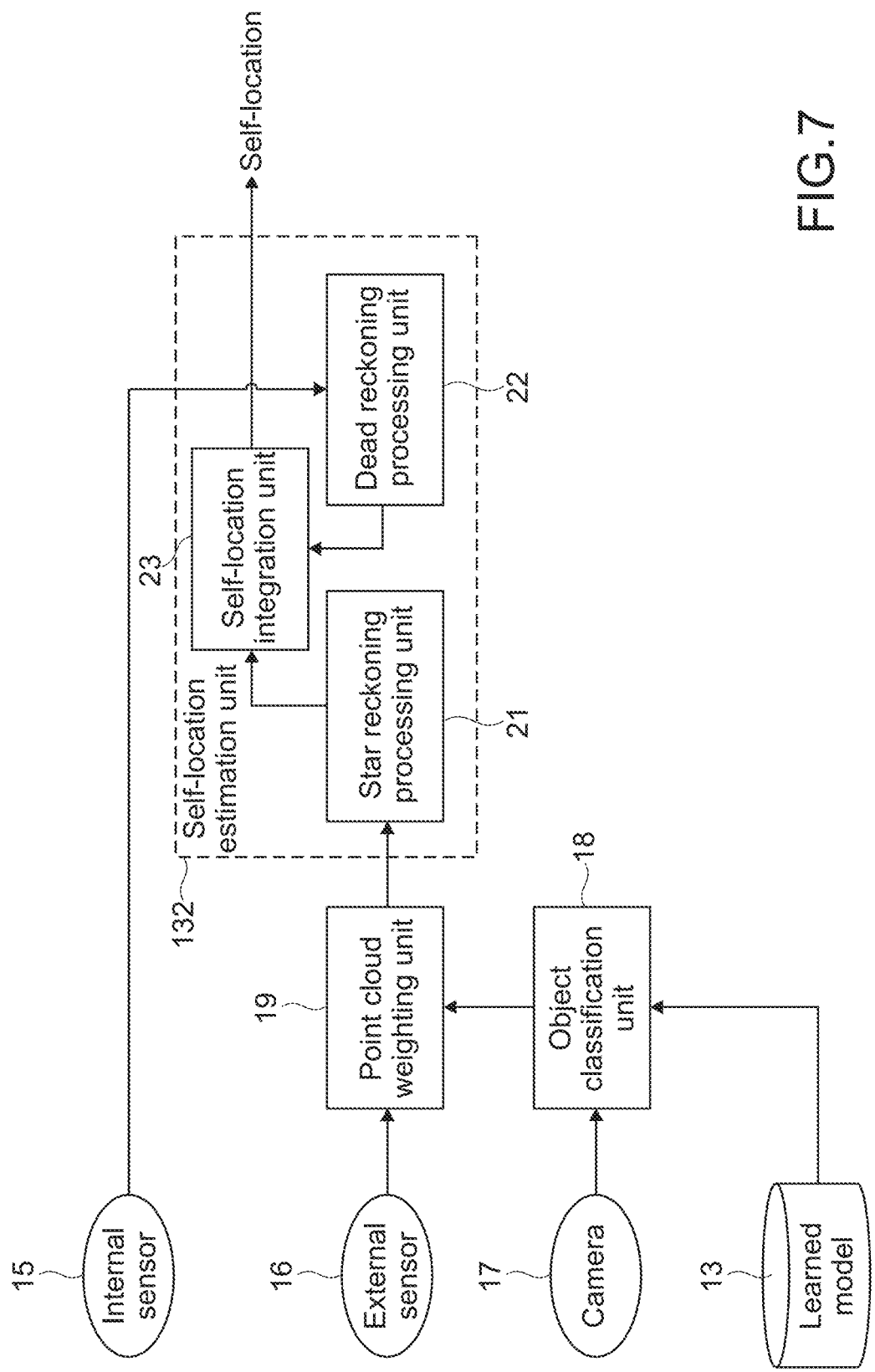
FIG. 7 is a schematic diagram showing a configuration example of blocks that operate when self-location estimation is executed.

FIG. 7 is a schematic diagram showing a configuration example of the blocks that operate when the self-location estimation is executed.

An internal sensor 15, an external sensor 16, and a camera 17 are included in the sensor group 112 shown in FIG. 1.

In this example, a sensor capable of outputting the detection information, with which the "point cloud data" in the present disclosure can be generated, is used as the external sensor 16. For example, a LiDAR or a ToF sensor is used as the external sensor 16, and three-dimensional point cloud data in a space is output as the "point cloud data".

Alternatively, a camera may be used as the external sensor 16. In this case, a plurality of image feature points extracted from an image output as the detection information is used as the "point cloud data".

The camera 17 may be used as the internal sensor 15 or the external sensor 16.

An object classification unit 18 performs semantic segmentation on the image input from the camera 17 according to the learned model 13, and detects an object. The detected object is then classified.

A point cloud weighting unit 19 adds a weight to the "point cloud data" acquired from the detection information by the external sensor 16 on the basis of the classification result by the object classification unit 18.

The object classification unit 18 and the point cloud weighting unit 19 are configured in, for example, the mobile object exterior information detection unit 141 shown in FIG. 1. The object classification unit 18 and the point cloud weighting unit 19 are not limited to the above and may be configured in another block such as the self-location estimation unit 132. Alternatively, a new block may be configured.

The self-location estimation unit 132 includes a star reckoning processing unit 21, a dead reckoning processing unit 22, and a self-location integration unit 23.

The star reckoning processing unit 21 executes star reckoning using the point cloud data to which the weight is added by the point cloud weighting unit 19. The star reckoning processing unit 21 then estimates the self-location of the mobile object.

The dead reckoning processing unit 22 executes dead reckoning on the basis of the detection information detected by the internal sensor 15, and estimates the self-location. The specific algorithm for executing dead reckoning is not limited.

The self-location integration unit 23 integrates the estimation result of the self-location by the star reckoning with the estimation result of the self-location by the dead reckoning to estimate the self-location of the mobile object and outputs self-location information. The specific algorithm for integrating the estimation results is not limited.

Figure 8:
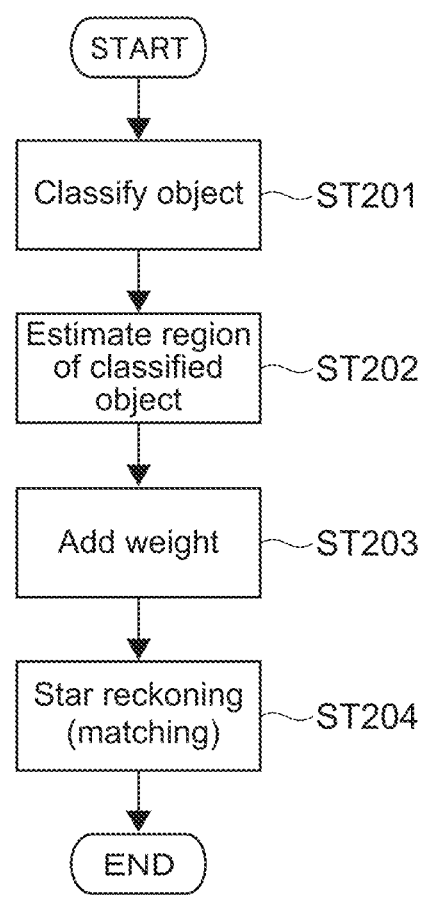
FIG. 8 is a flowchart showing an example of self-location estimation by the star reckoning.

FIG. 8 is a flowchart showing an example of the self-location estimation by the star reckoning.

The object classification unit 18 detects an object in a space and classifies the detected object (Step 201). For example, as shown in FIG. 5, the detected object is classified into one of a moving object, a quasi-stationary object, and a stationary object.

Step 201 corresponds to Steps 101 and 102 shown in FIG. 1.

The point cloud weighting unit 19 estimates the region of the classified object on the basis of the classification result by the object classification unit 18. That is, it is estimated which region of the point cloud data (three-dimensional point cloud data or image feature points) acquired from the detection information by the external sensor 16 is a moving object, a quasi-stationary object, or a stationary object (Step 203).

The point cloud weighting unit 19 adds a weight to the point cloud data on the basis of the classification result. Specifically, a weight is added to the point cloud data included in the region estimated as a moving object, a quasi-stationary object, or a stationary object in Step 203. Hereinafter, the point cloud data included in the region estimated as a moving object, a quasi-stationary object, or a stationary object may be referred to as point cloud data classified as a moving object, a quasi-stationary object, or a stationary object.

For the addition of the weight, for example, in the star reckoning (matching) of Step 204, the weight of the point cloud data classified as a quasi-stationary object is set higher than the weight of the point cloud data classified as a moving object. Further, the weight of the point cloud data classified as a stationary object is set higher than the weight of the point cloud data classified as a quasi-stationary object.

For example, a first weight is added to the point cloud data classified as a moving object. A second weight higher than the first weight is added to the point cloud data classified as a quasi-stationary object. A third weight higher than the second weight is added to the point cloud data classified as a stationary object.

In addition, as described in the above description of the priority, various methods may be employed as the method of adding the weight.

Steps 202 and 203 correspond to Step 103 shown in FIG. 1. That is, the addition of the weight corresponds to the setting of the priority. Therefore, the first to third weights correspond to the first to third priorities.

Note that, when the semantic segmentation capable of detecting an object at the pixel level is performed, high accuracy is exhibited regarding the classification and weighting for the point cloud data. This makes it possible to improve the accuracy of the autonomous movement control of the mobile object.

The star reckoning processing unit 21 executes star reckoning using the point cloud data to which the weight is added. In this embodiment, the point cloud data and the pre-map are matched to estimate the self-location (Step 204).

Figure 9A:
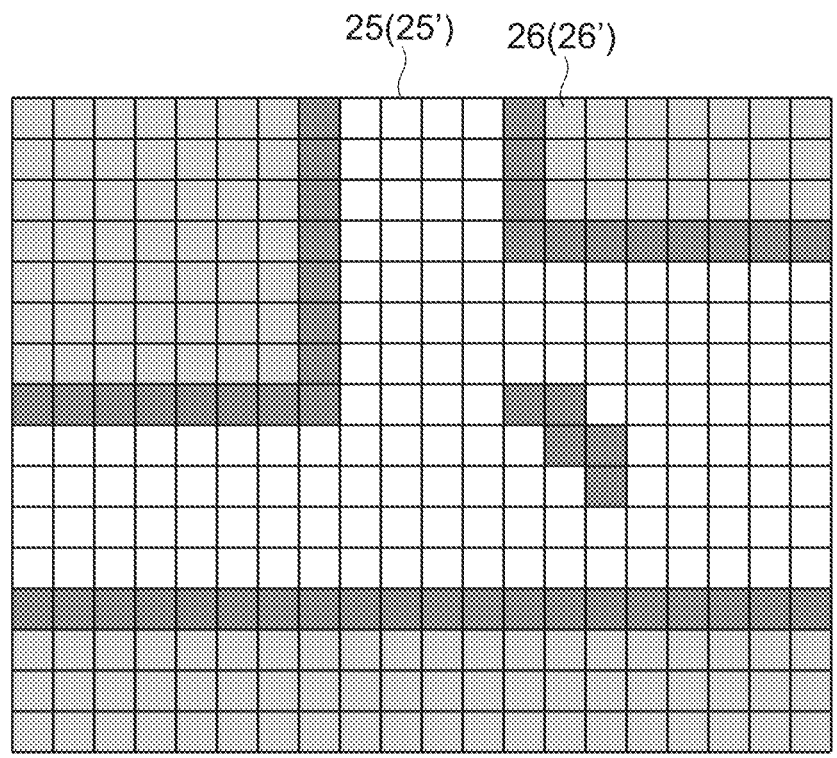
FIGS. 9A and 9B are schematic diagrams for describing an example of a pre-map.
Figure 9B:
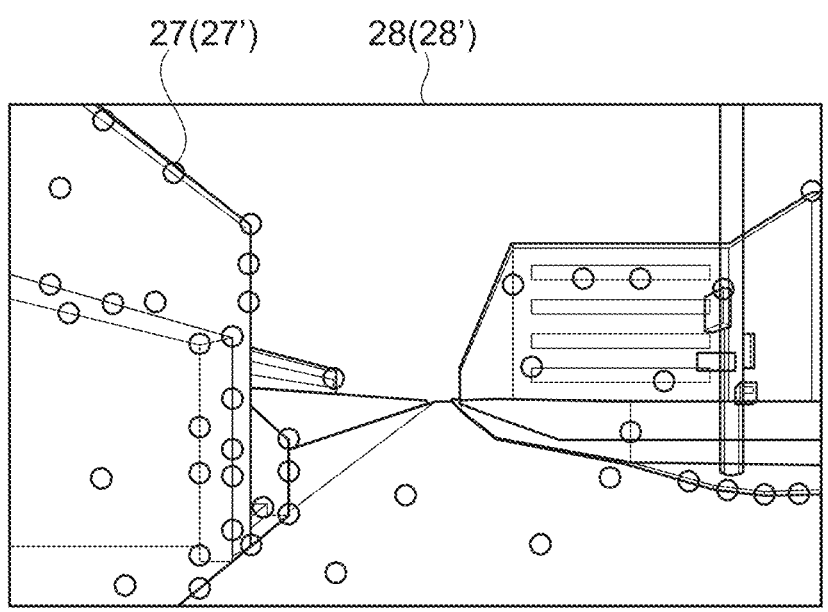

FIGS. 9A and 9B are schematic diagrams for describing an example of a pre-map.

For example, as shown in FIG. 9A, an occupancy grid map 25 is used as a pre-map. The self-location is then estimated by matching the three-dimensional point cloud data obtained by a LIDAR or a ToF sensor with the occupancy grid map 25.

In this embodiment, the three-dimensional point cloud data to which the weight is added in Step 203 and the occupancy grid map 25 are matched, and thus the self-location is estimated. That is, the detection information (three-dimensional point cloud data) and the map information (occupancy grid map) are collated on the basis of the set priority, so that the position information (self-location) of the mobile object is generated.

For example, a weight of zero is added to the three-dimensional point cloud data classified as a moving object. This makes it possible to remove the three-dimensional point cloud data serving as the moving object from the matching targets. On the other hand, a lower weight is added to the three-dimensional point cloud data classified as a quasi-stationary object. A higher weight is added to the three-dimensional point cloud data classified as a stationary object. As a result, in a state in which the weight of the three-dimensional point cloud data serving as the stationary object is higher than that of the three-dimensional point cloud data serving as the quasi-stationary object, they can be handled as matching targets.

In this embodiment, the three-dimensional point cloud data serving as a quasi-stationary object and the three-dimensional point cloud data serving as a stationary object, which are handled as matching targets, correspond to the collation target information that is selected from the detection information on the basis of the weighting (priority) and is to be collated with the map information. The method of selecting the collation target information is not limited, and any method may be used.

On the basis of the weighting (priority) as described above, it is also possible to select, from the detection information, the collation target information to be collated with the map information.

Since it is possible to perform the matching on the basis of the weighting as described above, it becomes possible to estimate the self-location with high accuracy, and to improve the accuracy of the autonomous movement control.

On the basis of the three-dimensional point cloud data obtained by a LiDAR or a ToF sensor, a surrounding occupancy grid map 25' at the present time is created as the current detection information. It is also possible to estimate the self-location by matching the occupancy grid map 25' at the present time with the occupancy grid map 25 that is the pre-map.

In such a case, a weight (priority) may be added for each grid 26' of the occupancy grid map 25' at the present time on the basis of the weight added to the three-dimensional point cloud data.

For example, a first weight (priority) is added to a grid 26' having a high occupation probability of the three-dimensional point cloud data classified as a moving object. A second weight (priority) higher than the first weight (priority) is added to a grid 26' having a high occupancy probability of the three-dimensional point cloud data classified as a quasi-stationary object. A third weight (priority) higher than the second weight (priority) is added to a grid 26' having a high occupation probability of the three-dimensional point cloud data classified as a stationary object.

By using the occupancy grid map 25' to which the weight (priority) is added in such a manner, the self-location can be estimated with high accuracy. As a result, it becomes possible to improve the accuracy of autonomous movement control.

As shown in FIG. 9B, image feature points 27 associated with the position information may be used as a pre-map. The image feature points 27 are feature points extracted from an image 28 captured by a camera. The method of extracting the image feature points 27 is not limited, and any algorithm may be used.

For example, a space is scanned by the mobile object in advance, and a camera captures an image 28 of the space. Image feature points 27 are extracted from the captured image 28 and associated with the position information. The method of associating the image feature points 27 with the position information is not limited, and the position information is associated on the basis of the position information of the mobile object at the time of imaging, the detection information from the internal sensor or the external sensor, or the like.

In Step 204 shown in FIG. 8, image feature points 27' extracted from an image 28' captured by the camera and the image feature points 27 stored as the pre-map are matched, thus estimating the self-location.

Specifically, the image feature points 27' to which the weight is added in Step 203 are matched with the image feature points 27 stored as the pre-map, thus estimating the self-location. That is, the detection information (image feature points 27') and the map information (image feature points 27) are collated on the basis of the set priority, and thus the position information (self-location) of the mobile object is generated.

For example, a weight of zero is added to the image feature point 27' classified as a moving object. This makes it possible to remove the image feature point 27' serving as the moving object from the matching targets. On the other hand, a lower weight is added to the image feature point 27' classified as a quasi-stationary object. A higher weight is added to the image feature point 27' classified as a stationary object. As a result, in a state in which the weight of the image feature point 27' serving as the stationary object is higher than that of the image feature point 27' serving as the quasi-stationary object, those image feature points 27' can be handled as matching targets.

Since it is possible to perform the matching on the basis of the weighting in such a way, it becomes possible to estimate the self-location with high accuracy, and to improve the accuracy of the autonomous movement control.

Note that the pre-map may be created by the mobile object itself or another mobile object.

The self-location estimation by the star reckoning of Step 204 corresponds to the generation of the position-related information of Step 104 shown in FIG. 1. Note that the self-location output from the self-location integration unit 23 is also included in the position-related information.

The present technology is not limited to the above-mentioned processing, and any other processing may be performed as the self-location estimation using the point cloud data to which a weigh is added by the star reckoning.

[Generation of Map Information]

Figure 10:
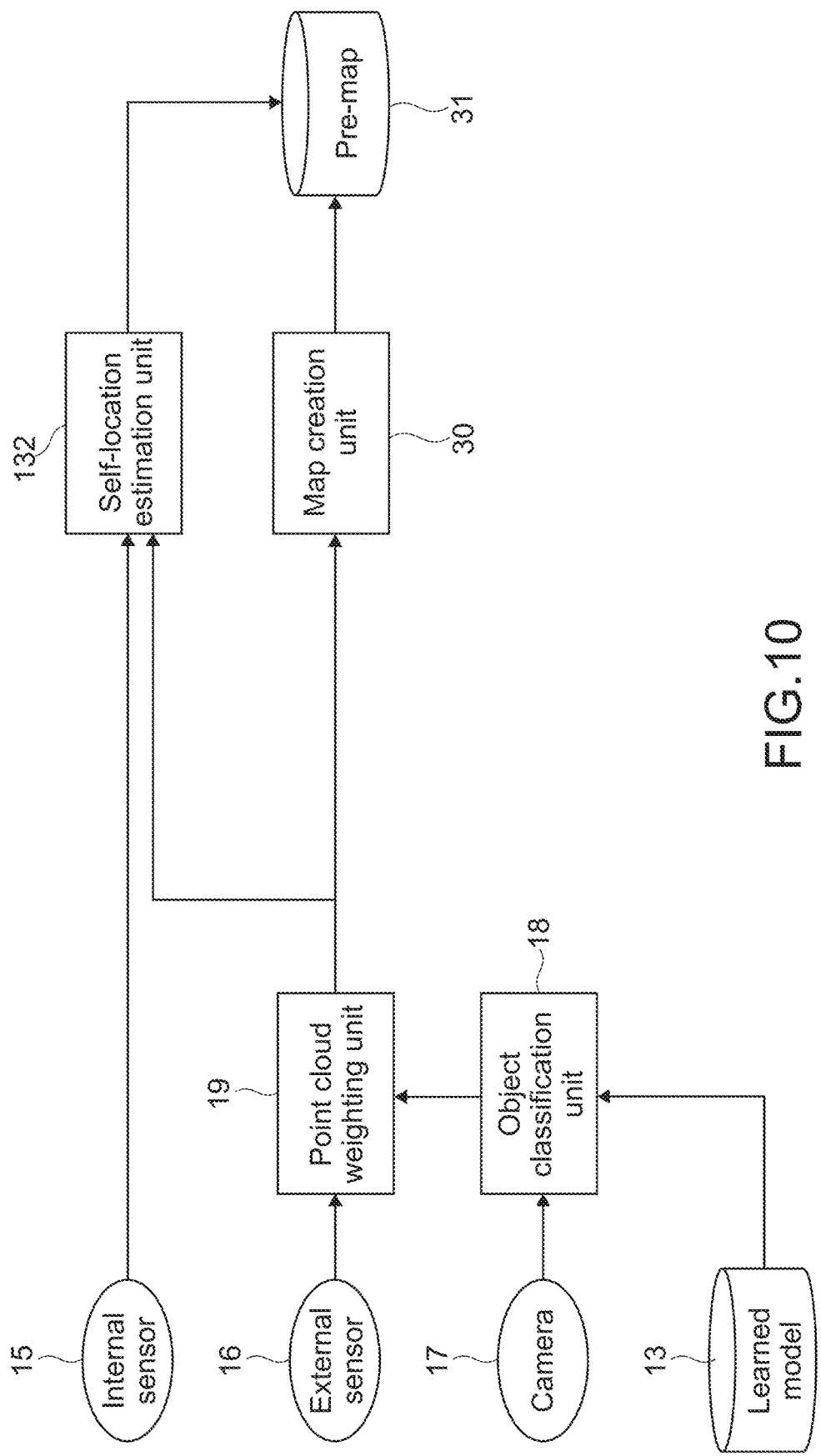
FIG. 10 is a diagram showing a configuration example of blocks that operate when map information is generated.

FIG. 10 is a schematic diagram showing a configuration example of the blocks that operate when the map information is generated. To simplify the description, the same reference numerals are added to the same blocks as those shown in FIG. 7. It is needless to say that the present technology is not necessarily limited to the case where blocks that operate in the self-location estimation are used.

A map creation unit 30 generates map information. Although illustrated as a different block in FIG. 10, the map creation unit 30 is configured, for example, in the self-location estimation unit 132. Of course, the map creation unit 30 may be configured in other blocks or as a new block.

The map information generated by the map creation unit 30 and the self-location estimated by the self-location estimation unit 132 are associated with each other to generate a pre-map 31.

Figure 11:
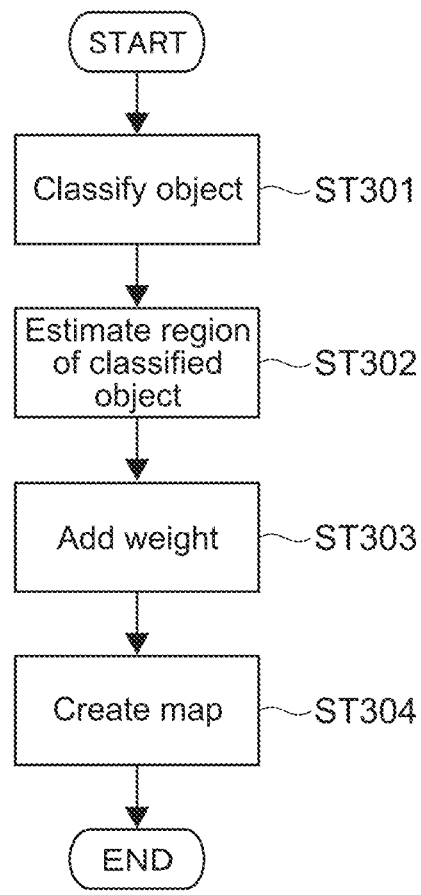
FIG. 11 is a flowchart showing a generation example of the map information.

FIG. 11 is a flowchart showing a generation example of the map information.

Steps 301 to 302 are the same processes as Steps 201 to 203 shown in FIG. 8. Therefore, Steps 101 to 103 shown in FIG. 2 are executed by those steps.

The map creation unit 30 creates map information using the point cloud data to which a weight has been added (Step 304). The map information includes the position of the object detected in the space and the priority (weight) set for the object.

For example, as shown in-A of FIG. 9A, the occupancy grid map 25 is created on the basis of the three-dimensional point cloud data obtained by a LIDAR or a ToF sensor. At that time, a weight (priority) is added to each grid 26 of the occupancy grid map 25 on the basis of the weight (priority) added to the three-dimensional point cloud data.

For example, a first weight (priority) is added to a grid 26 having a high occupation probability of the three-dimensional point cloud data classified as a moving object. A second weight (priority) higher than the first weight (priority) is added to a grid 26 having a high occupancy probability of the three-dimensional point cloud data classified as a quasi-stationary object. A third weight (priority) higher than the second weight (priority) is added to a grid 26 having a high occupancy probability of the three-dimensional point cloud data classified as a stationary object.

Adding the weight to each grid 26 makes it possible to define whether the information of the grid 26 is a matching target or not during matching in the star reckoning processing. Further, when it is defined as the matching target, the weight thereof can be controlled. As a result, it becomes possible to estimate the self-location with high accuracy, and to improve the accuracy of autonomous movement control.

Further, as shown in FIG. 9B, the map information can also be created by associating the image feature point 27 extracted from the image 28 captured by the camera with the position information. At that time, a weight (priority) is added to the image feature point 27.

Adding the weight to the image feature point 27 makes it possible to define whether the image feature point 27 is a matching target or not during matching in the star reckoning processing. Further, when it is defined as the matching target, the weight thereof can be controlled. As a result, it becomes possible to estimate the self-location with high accuracy, and to improve the accuracy of autonomous movement control.

The creation of the map information on the basis of the priority described herein is not only applied to the creation of a self-location estimation map. For example, it can be applied to the creation of a situation recognition map by the situation recognition unit 152. It is also applicable to the creation of other map information.

[Generate Divided Map Information]

Figure 12:
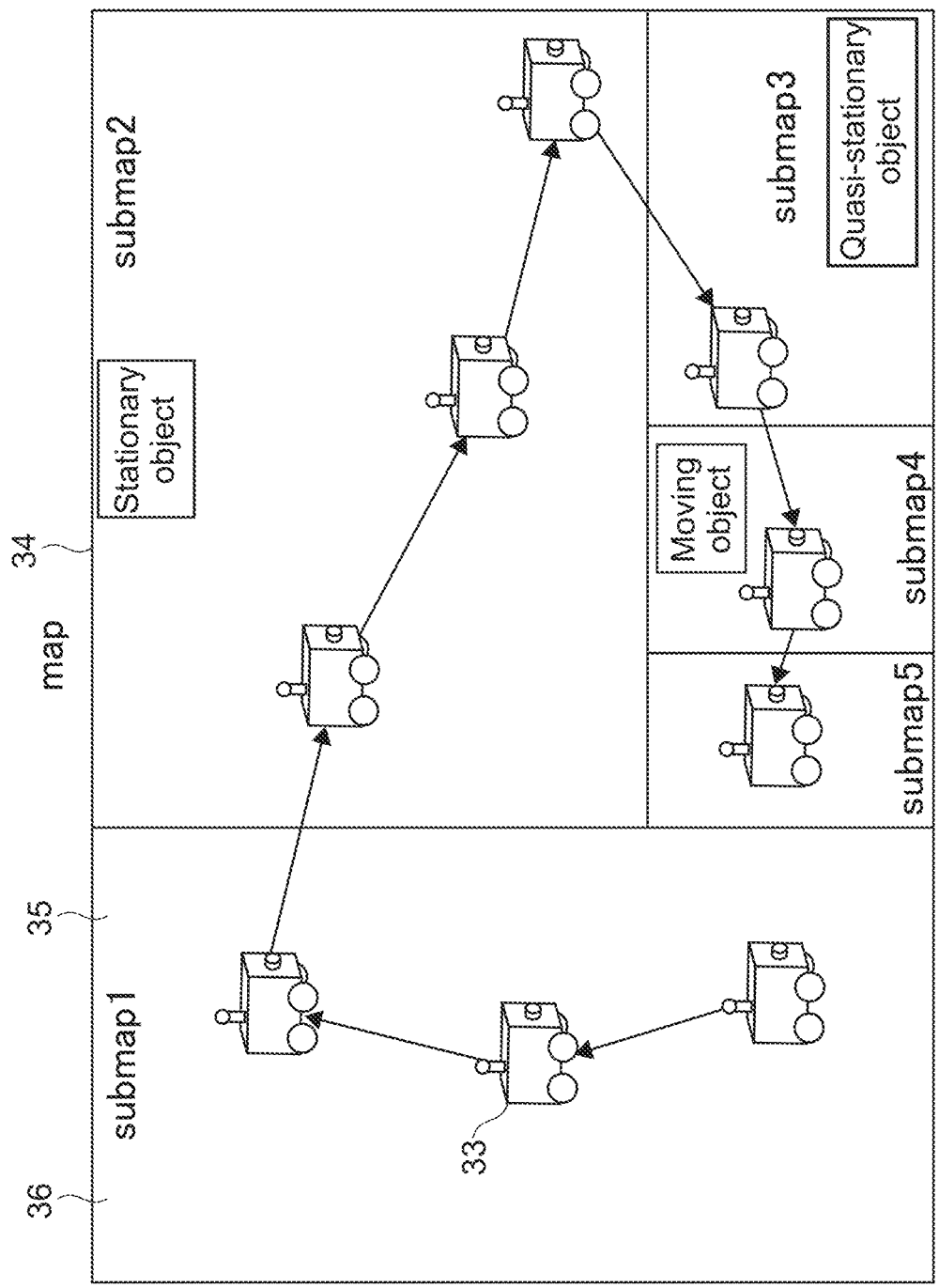
FIG. 12 is a schematic diagram for describing divided map information.

FIG. 12 is a schematic diagram for describing divided map information.

A mobile object 33 scans a space, and map information 34 is generated. At that time, it is also possible to set divided regions 35 for dividing the space into a plurality of regions, and to create map information for each divided region 35. Hereinafter, the map information generated for each divided region 35 is referred to as divided map information 36.

In the example shown in FIG. 12, "map" is illustrated as data of the entire map information 34. Submaps 1 to 5 are illustrated as respective pieces of data of the divided map information 36.

In this embodiment, it is possible to set the divided regions on the basis of the position of the object detected in the space and the classification result of the object. That is, it is possible to set the size, the boundary, and the like of the divided regions on the basis of the classification result of the object detected during the scanning of the mobile object 33.

For example, it is assumed that an object is detected during scanning of the mobile object 33 and classified as a moving object (hereinafter, description that a moving object is detected will be used). Since the moving object is likely to move, the map information of that region is likely to need to be updated. Therefore, the divided region 35 having a relatively small size is set so as to include the region in which the moving object is detected. This makes it possible to reduce the processing load when the divided map information 36 corresponding to the divided region 35 is updated, and to improve the processing speed.

For example, it is assumed that a moving object is detected when the divided region 35 is set at a predetermined division rate. In this case, the divided region 35 is set according to the detection of the moving object without following the division rate.

When a stationary object is detected, the map information of that region does not need to be updated, so the divided region 35 is not set. When the divided region 35 is executed at a predetermined division rate, the divided region 35 is set according to the division rate.

When a quasi-stationary object is detected, for example, the divided region 35 is set so as to have a larger size than that when a moving object is detected.

In addition, the divided region 35 may be set by any method on the basis of the detection position of the object and the classification result of the object.

For the update of the divided map information 36, an object is detected and classified by the mobile object 33 that has scanned the space again. On the basis of the classification result, the divided map information 36 is updated. For example, when a movement of an object (such as a moving object or a quasi-stationary object) from the divided region 35 is detected, the divided map information 36 corresponding to the divided region 35 is updated.

In addition, the update of the divided map information 36 may be executed by any method on the basis of the detection position of the object and the classification result of the object.

Figure 13:
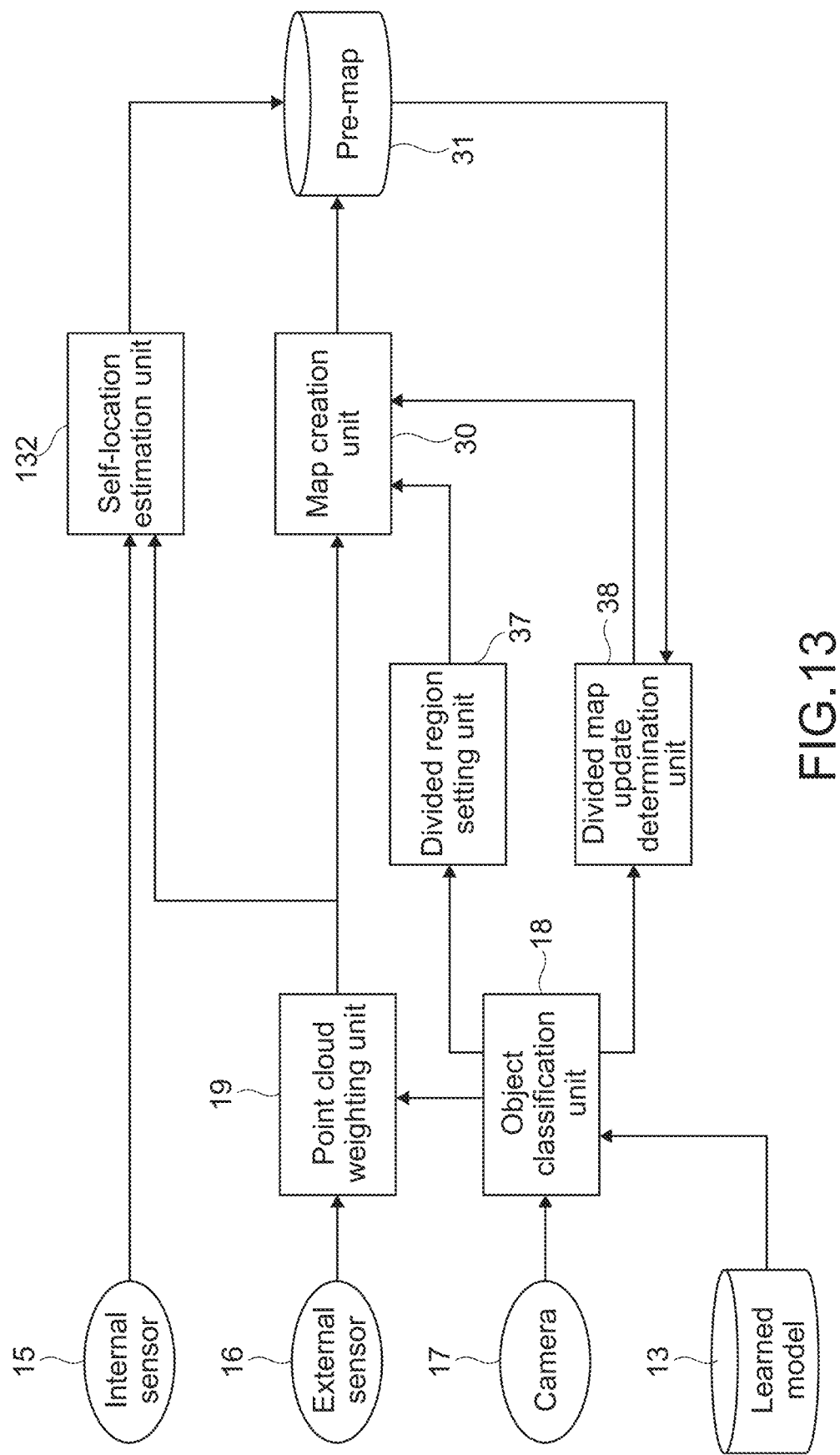
FIG. 13 is a schematic diagram showing a configuration example of blocks that operate when the divided map information is generated.

FIG. 13 is a schematic diagram showing a configuration example of the blocks that operate when the divided map information 36 is generated.

A divided region setting unit 37 sets the divided region 35 on the basis of the classification result from the object classification unit 18. For example, the divided region 35 is set by determining a boundary (division line) or the like for dividing the space on the basis of the classification result. In addition, the boundary of the divided region 35 and the like are set on the basis of the current position of the mobile object 33. The present technology is not limited to the above.

A divided map update determination unit 38 determines whether or not to update the divided map information 36 on the basis of the classification result from the object classification unit 18.

Although illustrated as different blocks in FIG. 13, the divided region setting unit 37 and the divided map update determination unit 38 are configured in, for example, the self-location estimation unit 132. Of course, the divided region setting unit 37 and the divided map update determination unit 38 may be configured in other blocks or as new blocks.

Figure 14:
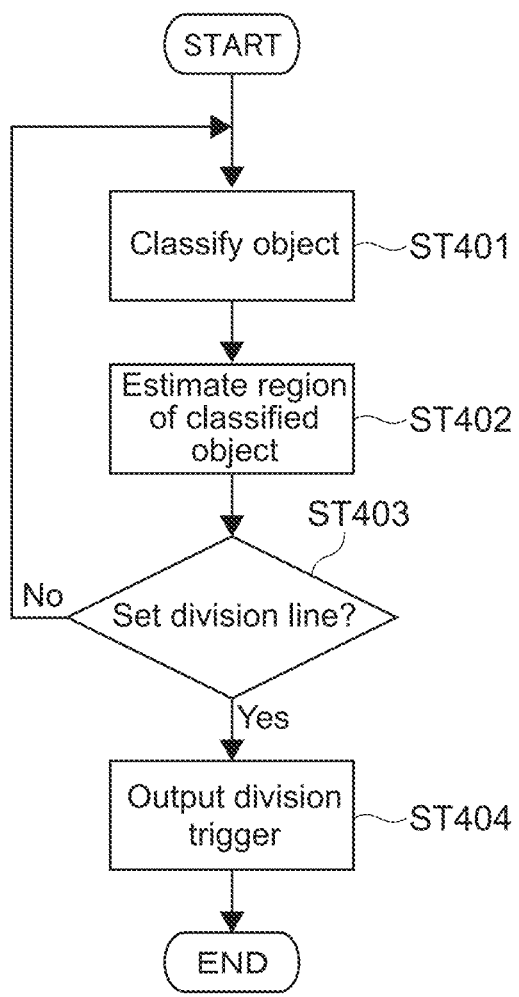
FIG. 14 is a flowchart showing an example of setting divided regions.

FIG. 14 is a flowchart showing an example of setting a divided region. For example, when the map information 34 is created for the first time in a certain space, the processing shown in FIG. 14 is executed.

Steps 401 and 402 are similar processes to Steps 301 and 302 shown in FIG. 11.

The divided region setting unit 37 determines whether or not to set a division line. That is, it is determined whether or not the space is divided to set the divided regions 35 (Step 403).

For example, the division line is set on the basis of the presence or absence of detection of a moving object, the number of moving objects (the number of regions classified as moving objects), the size of the region classified as a moving object, the presence or absence of detection of a quasi-stationary object, the number of quasi-stationary objects (the number of regions classified as quasi-stationary objects), the size of the region classified as a quasi-stationary object, the presence or absence of detection of a stationary object, the number of stationary objects (the number of regions classified as stationary objects), the size of the region classified as a quasi-stationary object, and the like.

Alternatively, it may be determined whether or not the division line is set by the equations exemplified below.

$\alpha1\times$(number of moving objects)+$\beta1$(number of quasi-stationary objects)+$\gamma1$(number of stationary objects)>threshold $\theta1$ $\alpha2\times$(size of moving object region)+$\beta2$(size of quasi-stationary object region)+$\gamma2$(size of stationary object region)>threshold $\theta2$ $\alpha3\times$(number of point clouds classified as moving objects)+$\beta3$(number of point clouds classified as quasi-stationary objects)+$\gamma3$(number of point clouds classified as stationary objects)>threshold $\theta3$ If those equations are satisfied, it is determined that the division line is to be set. Note that ($\alpha1$, $\beta1$, $\gamma1$, $\theta1$), ($\alpha2$, $\beta2$, $\gamma2$, $\theta2$), and ($\alpha3$, $\beta3$, $\gamma3$, $\theta3$) are setting parameters, and may be arbitrarily set.

If it is determined that the division line is to be set (Yes in Step 403), a division trigger is output to the map creation unit 30 (Step 404).

The map creation unit 30 generates the divided map information 36 on the basis of the division trigger, and assigns an ID such as a submap 1. The generated divided map information 36 is stored as a pre-map.

Note that, for a method of generating the divided map information 36, the entire map information 34 may be generated and divided on the basis of the division trigger, and the divided map information 36 may be generated. Alternatively, the divided map information 36 may be generated each time the division trigger is output.

The divided map information 36 is generated on the basis of the weight added by the point cloud weighting unit 19.

Figure 15:
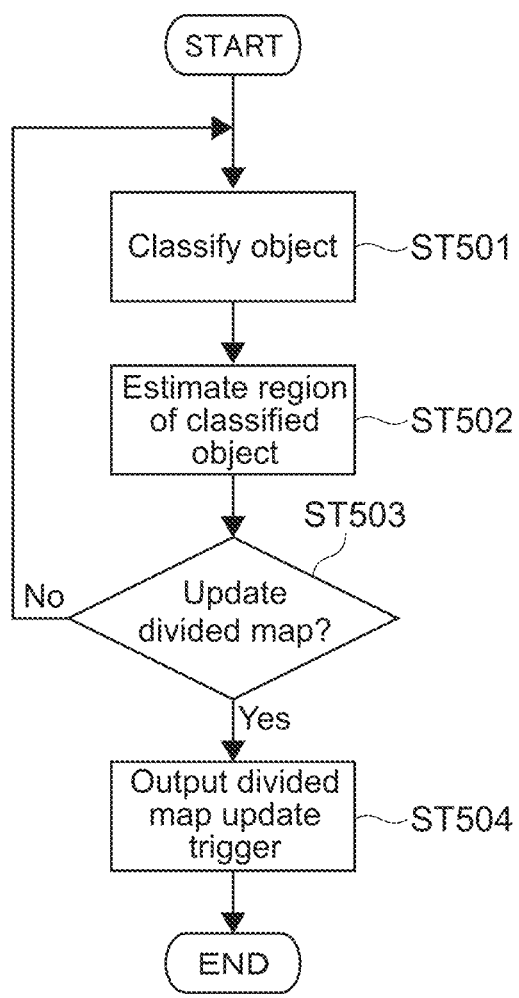
FIG. 15 is a flowchart showing an example of updating the divided map information.

FIG. 15 is a flowchart showing an example of updating the divided map information 36. For example, the processing shown in FIG. 15 is executed in the second and subsequent scanning.

Steps 501 and 502 are similar processes to Steps 401 and 402 shown in FIG. 14.

The divided map update determination unit 38 determines whether or not to update the divided map information 36 (Step 503). For example, when a movement of an object (moving object or quasi-stationary object) from the divided region 35 is detected, the divided map information 36 corresponding to the divided region 35 is updated.

For example, the movement of the object can be detected by matching the classified point cloud data acquired at the time of the second or subsequent scanning with the divided map information 36 generated so far. Any other algorithm may be used.

Alternatively, the update of the divided map information 36 may be determined on the basis of the change in the result of the following expressions.

$\alpha1\times$(number of moving objects)+$\beta1$(number of quasi-stationary objects)+$\gamma1$(number of stationary objects)

$\alpha2\times$(size of moving object region)+$\beta2$(size of quasi-stationary object region)+$\gamma2$(size of stationary object region)

$\alpha3\times$(number of point clouds classified as moving objects)+$\beta3$(number of point clouds classified as quasi-stationary objects)+$\gamma3$(number of point clouds classified as stationary objects)

If the change in the results of those expressions are greater than a predetermined threshold, the divided map information 36 is updated.

Note that the update information for updating the divided map information 36 may be generated on the basis of the classification result of the object in the divided region 35. The update information includes, for example, at least one of the necessity of update, the timing of update, or the frequency of update.

For example, when a large number of moving objects are detected in the divided region 35, the necessity of update is set, and the frequency of update is set to be higher than usual. For example, when a large number of stationary objects are detected in the divided region 35, the necessity of update is not set. Alternatively, the frequency of update is set less frequently than usual.

For example, when the divided map information 36 is generated, the update information may be generated for each divided region 35 in combination with the setting of the divided region 35. The divided map information 36 may be updated according to the necessity of update, the timing of update, or the frequency of update included in the generated update information.

If it is determined that the divided map information 36 is updated (Yes in Step 503), a divided map update trigger is output to the map creation unit 30 together with the ID of the divided map information (Step 504).

The map creation unit 30 updates the divided map information 36 corresponding to the output ID on the basis of the division trigger. The update of the divided map information 36 is executed on the basis of the weight added by the point cloud weighting unit 19.

Note that the generation of the divided map information 36 is applicable to any map information including the occupancy grid map 25 exemplified in FIG. 9A or the image feature points 27 including the position information.

[Combination of Self-Location Estimation and Map Information Generation]

The self-location estimation based on the classification result described with reference to FIGS. 6, 7, 8, 9A, and 9B and the map information generation based on the classification result described with reference to FIGS. 10 to 15 may be combined.

Figure 16:
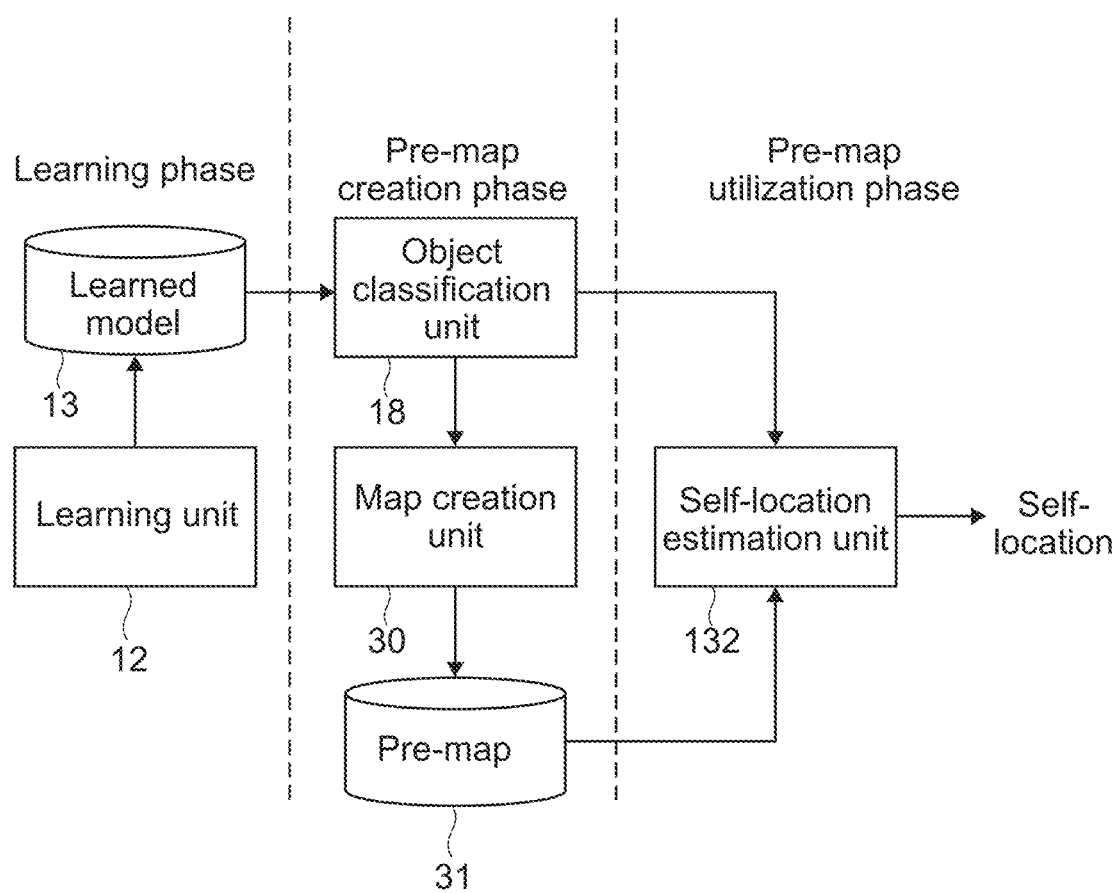
FIG. 16 is a schematic block diagram showing a combination of self-location estimation and map information generation.

FIG. 16 is a schematic block diagram showing a combination of the self-location estimation and the map information generation based on the priority.

For example, as shown in FIG. 16, the following three phases are provided: a learning phase, a pre-map creation phase, and a pre-map utilization phase.

In the learning phase, the learned model of the semantic segmentation is generated.

In the pre-map creation phase, the map information 34 is created on the basis of the classification result by the object classification unit 18, and stored as the pre-map 31. Of course, the priority may be set on the basis of the classification result.

In the pre-map creation phase, the self-location of the mobile object is estimated on the basis of the classification result by the object classification unit 18. Of course, the priority may be set on the basis of the classification result.

Thus, the occupancy grid map 25 as a pre-map to which a weight is added and the three-dimensional point cloud data to which a weight is added are matched. Alternatively, the occupancy grid map 25 as a pre-map to which a weight is added and the current occupancy grid map 25' to which a weight is added are matched.

Alternatively, the image feature point 27 as a pre-map to which a weight is added and the current image feature point 27' to which a weight is added are matched.

This makes it possible to estimate the self-location with very high accuracy and to improve the accuracy of autonomous movement control.

As described above, in the mobile object (information processing apparatus) according to this embodiment, the object detected in the space is classified on the basis of predetermined criteria, and the priority is set on the basis of the classification result. On the basis of the set priority, the position-related information regarding the position in the space is generated. Use of such position-related information makes it possible to improve the accuracy of autonomous movement control.

According to the present technology, the weighted map matching and the method of updating a pre-map in a dynamically changing environment are newly presented.

In the map matching system algorithm using three-dimensional point cloud data and image feature points, the accuracy may deteriorate if the environment changes between the time of the map creation and the time of the self-location estimation utilizing the map.

For example, there may be a case where unmatching or erroneous matching with the three-dimensional point cloud or image feature points currently acquired occurs with respect to a map created in advance due to an environment change, and the accuracy of the self-location decreases.

Examples of environmental changes are listed below.

Example 1: Persons, packages, and the like that are present at the time of map creation are absent at the time of map utilization.

Example 2: Packages that were not at the time of map creation appear at the time of map utilization.

Example 3: The environment dynamically changes, like an automated door.

Use of the present technology makes it possible to solve such problems, and to achieve highly accurate self-location estimation and autonomous movement control.

OTHER EMBODIMENTS

The present technology is not limited to the embodiments described above and can achieve various other embodiments.

The creation of the divided map information described above can also be applied to the case of creating the map information without being based on the weight added by the point cloud weighting unit 19. That is, it is also possible to use the classification result of the object classification unit 18 only for setting the divided region 35. Also in this case, it is possible to improve the accuracy of the autonomous movement control by setting the divided region 35 on the basis of the classification result.

This processing can also be processing in which Step 103 shown in FIG. 2 is omitted.

In addition, any processing may be executed on the basis of the classification result while the priority setting is omitted.

In the above description, the detected object is classified on the basis of the likelihood of movement of the object. The present technology is not limited to this, and the classification may be performed according to other criteria such as the type, function, size, and the like of the object.

As described above, the application of the present technology is not limited to robots, but can be applied to various other mobile objects. For example, it is applicable to any mobile object, such as automobiles, electric vehicles, hybrid electric vehicles, motorcycles, bicycles, personal mobility, airplanes, drones, ships, robots, construction machinery, and agricultural machinery (tractors).

In the above description, the case has been exemplified in which the information processing apparatus according to the present technology is configured by a computer mounted on a mobile object, and the information processing method according to the present technology is executed. The present technology is not limited to this, and the information processing apparatus according to the present technology may be achieved by any computer (e.g., a server apparatus on a network) configured separately from the mobile object and connected to a server apparatus via a wired or wireless connection. Alternatively, the information processing method and the program according to the present technology may be executed by linking a computer mounted on a mobile object with another computer capable of communicating via a network or the like (e.g., a cloud system), thereby constructing the information processing apparatus according to the present technology.

In other words, the information processing method and the program according to the present technology may be executed not only in a computer system configured by a single computer but also in a computer system in which a plurality of computers operates in conjunction with each other. Note that, in the present disclosure, the system means an aggregate of a plurality of components (such as apparatuses or modules (parts)) and it does not matter whether or not all the components are housed in the identical casing. Therefore, a plurality of apparatuses housed in separate casings and connected to one another via a network, and a single apparatus having a plurality of modules housed in a single casing are both the system.

The execution of the information processing method and the program according to the present technology by the computer system includes both cases where, for example, the detection of an object, the classification of the object, the setting of a priority, the generation of position-related information (self-location estimation and map information generation), and the like are executed by a single computer and where each process is executed by a different computer. Further, the execution of each process by a specified computer includes causing another computer to execute part of or all of the processes and acquiring a result of the execution.

In other words, the information processing method and the program according to the present technology are also applicable to a cloud computing configuration in which one function is shared and cooperatively processed by a plurality of apparatuses via a network.

The mobile object, the information processing apparatus, the generation flow of the map information and the position-related information, and the like are merely one embodiment and can be optionally modified without departing from the gist of the present technology. In other words, any other configurations, algorithms, and the like for practicing the present technology may be employed.

Out of the feature parts according to the present technology described above, at least two feature parts can be combined. That is, the various feature parts described in the respective embodiments may be optionally combined irrespective of the embodiments. Further, various effects described above are merely examples and are not limited, and other effects may be exerted.

Note that the present technology may also be configured as below.

(1) An information processing apparatus, including:
a classification unit that classifies an object detected in a space on the basis of a predetermined criterion; and
a generation unit that sets a priority for the object on the basis of a classification result by the classification unit, and generates position-related information regarding a position in the space on the basis of the set priority.

(2) The information processing apparatus according to (1), in which
the classification unit classifies the object on the basis of a likelihood of movement of the object.

(3) The information processing apparatus according to (2), in which
the classification unit classifies the object on the basis of date and time information.

(4) The information processing apparatus according to (2) or (3), in which
the generation unit sets the priority on the basis of date and time information.

(5) The information processing apparatus according to any one of (2) to (4), in which
the classification unit classifies the object as a moving object, a quasi-stationary object, or a stationary object.

(6) The information processing apparatus according to (5), in which
the generation unit sets a first priority for the object classified as the moving object, sets a second priority higher than the first priority for the object classified as the quasi-stationary object, and sets a third priority higher than the second priority for the object classified as the stationary object.

(7) The information processing apparatus according to any one of (1) to (6), in which
the classification unit classifies the object on the basis of detection information detected by a sensor of a mobile object that moves in the space, and
the generation unit generates position information regarding a position and a posture of the mobile object in the space as the position-related information.

(8) The information processing apparatus according to (7), in which
the generation unit generates the position information of the mobile object by collating the detection information with map information regarding the space on the basis of the priority.

(9) The information processing apparatus according to (8), in which
the generation unit selects collation target information to be collated with the map information from the detection information on the basis of the priority.

(10) The information processing apparatus according to any one of (1) to (9), in which
the generation unit generates map information regarding the space as the position-related information.

(11) The information processing apparatus according to (10), in which
the map information includes the position of the object detected in the space and the priority set for the object.

(12) The information processing apparatus according to (10) or (11), in which
the map information includes at least one of an occupancy grid map or a group of image feature points each including position information.

(13) The information processing apparatus according to (12), in which
the map information is the occupancy grid map, and
the generation unit sets, on the basis of the priority, a priority for each grid of the occupancy grid map.

(14) The information processing apparatus according to any one of (10) to (13), in which
the generation unit sets divided regions for dividing the space into a plurality of regions on the basis of the classification result, and generates the map information for each of the divided regions.

(15) The information processing apparatus according to any one of (10) to (14), in which
the generation unit sets the divided regions on the basis of the position of the object detected in the space and the classification result of the object.

(16) The information processing apparatus according to (14) or (15), in which
the generation unit updates the map information corresponding to each of the divided regions on the basis of movement of the object from each of the divided regions.
(17) The information processing apparatus according to (16), in which
the generation unit generates update information for updating the map information generated for each of the divided regions on the basis of the classification result of the object in each of the divided regions.
(18) The information processing apparatus according to (17), in which
the update information includes at least one of a necessity of update, a timing of update, or a frequency of update.
(19) An information processing method executed by a computer system, the method including:
classifying an object detected in a space on the basis of a predetermined criterion; and
setting a priority for the object on the basis of a classification result by the classification, and generating position-related information regarding a position in the space on the basis of the set priority.
(20) A program causing a computer system to execute the steps of:
classifying an object detected in a space on the basis of a predetermined criterion; and
setting a priority for the object on the basis of a classification result by the classification, and generating position-related information regarding a position in the space on the basis of the set priority.

REFERENCE SIGNS LIST 18 object classification unit
19 point cloud weighting unit
21 star reckoning processing unit
22 dead reckoning processing unit
23 self-location integration unit
25 occupancy grid map
26 grid
27 image feature point
28 image
30 map creation unit
31 pre-map
33 mobile object
34 map information
35 divided region
36 divided map information
37 divided region setting unit
38 divided map update determination unit
100 mobile object control system
112 sensor group
131 detection unit
132 self-location estimation unit

The invention claimed is:
1. An information processing apparatus, comprising:
circuitry configured to:
classify an object, detected in a space, based on a specific criterion, wherein
the specific criterion comprises date and time information;
set a priority for the object based on a result of the classification; and
generate position-related information regarding a position of the information processing apparatus in the space based on the set priority for the object.
2. The information processing apparatus according to claim 1, wherein the circuitry is further configured to
classify the object based on a likelihood of movement of the object.
3. The information processing apparatus according to claim 2, wherein the circuitry is further configured to
classify the object as a moving object, a quasi-stationary object, or a stationary object.
4. The information processing apparatus according to claim 3, wherein the circuitry is further configured to
set a first priority for the object classified as the moving object, set a second priority higher than the first priority for the object classified as the quasi-stationary object, and set a third priority higher than the second priority for the object classified as the stationary object.
5. The information processing apparatus according to claim 1, wherein the circuitry is further configured to:
classify the object based on detection information detected by a sensor of a mobile object, wherein
the mobile object includes the information processing apparatus, and
the mobile object moves in the space; and
generate position information regarding a position and a posture of the mobile object in the space as the position-related information.
6. The information processing apparatus according to claim 5, wherein the circuitry is further configured to:
collate the detection information with map information based on the priority, wherein the map information is regarding the space; and
generate the position information of the mobile object based on the collation of the detection information with the map information.
7. The information processing apparatus according to claim 6, wherein the circuitry is further configured to
select collation target information from the detection information based on the priority; and
collate the collation target information with the map information.
8. The information processing apparatus according to claim 1, wherein the circuitry is further configured to
generate map information regarding the space as the position-related information.
9. The information processing apparatus according to claim 8, wherein
the map information includes a position of the object detected in the space and includes the priority set for the object.
10. The information processing apparatus according to claim 8, wherein
the map information includes at least one of an occupancy grid map or a group of image feature points each including position information.
11. The information processing apparatus according to claim 8, wherein the circuitry is further configured to:
set divided regions, for division of the space into a plurality of regions, based on the result; and
generate the map information for each of the divided regions.
12. The information processing apparatus according to claim 11, wherein the circuitry is further configured to
set the divided regions based on a position of the object detected in the space and the result of the classification for the object.

13. The information processing apparatus according to claim 11, wherein the circuitry is further configured to
update the map information corresponding to each of the divided regions based on movement of the object from each of the divided regions.

14. The information processing apparatus according to claim 13, wherein the circuitry is further configured to
generate update information to update the map information generated for each of the divided regions, wherein the update information is generated based on the result of the classification for the object in each of the divided regions.

15. The information processing apparatus according to claim 14, wherein
the update information includes at least one of a necessity of update, a timing of update, or a frequency of update.

16. An information processing apparatus, comprising circuitry configured to:
classify an object, detected in a space, based on a specific criterion;
set a priority for the object based on a result of the classification;
generate position-related information regarding a position in the space based on the set priority for the object;
generate map information regarding the space as the position-related information, wherein the map information is an occupancy grid map; and
set, based on the set priority, a priority for each grid of the occupancy grid map.

17. An information processing method, comprising:
in an information processing apparatus:
classifying an object, detected in a space, based on a specific criterion, wherein
the specific criterion comprises date and time information;
setting a priority for the object based on a result of the classification; and
generating position-related information regarding a position of the information processing apparatus in the space based on the set priority for the object.

18. A non-transitory computer-readable medium having stored thereon, computer-executable instructions which, when executed by an information processing apparatus, cause the information processing apparatus to execute operations, the operations comprising:
classifying an object, detected in a space, based on a specific criterion, wherein
the specific criterion comprises date and time information;
setting a priority for the object based on a result of the classification; and
generating position-related information regarding a position of the information processing apparatus in the space based on the set priority for the object.

* * * * *